United States Patent [19]

Yahata et al.

[11] Patent Number: 4,594,705
[45] Date of Patent: Jun. 10, 1986

[54] BUS-CONFIGURED LOCAL AREA NETWORK WITH DATA EXCHANGE CAPABILITY

[75] Inventors: Haruki Yahata, Fujisawa; Hiroshi Kobayashi, Tokyo, both of Japan

[73] Assignee: Tokyo Shibaura Denki Kabushiki Kaisha, Kawasaki, Japan

[21] Appl. No.: 594,896

[22] Filed: Mar. 29, 1984

[30] Foreign Application Priority Data

Mar. 31, 1983 [JP] Japan ................................ 58-53763
Mar. 31, 1983 [JP] Japan ................................ 58-53764

[51] Int. Cl.$^4$ .................... H04Q 11/04; H04J 3/02; H04J 1/16; H04J 3/14
[52] U.S. Cl. ........................................ 370/67; 370/85; 370/13
[58] Field of Search ................ 370/67, 13, 90, 94, 370/60, 96, 85, 86, 88, 56, 95, 100; 340/825.5

[56] References Cited

U.S. PATENT DOCUMENTS

| | | | |
|---|---|---|---|
| 3,851,104 | 11/1974 | Willard et al. | 370/84 |
| 3,984,642 | 10/1976 | Potter et al. | 370/56 |
| 4,078,228 | 3/1978 | Miyazaki | 370/89 |
| 4,149,144 | 4/1979 | Diefenderfer | 370/96 |
| 4,161,634 | 7/1979 | Bellisio | 370/96 |
| 4,229,792 | 10/1980 | Jensen et al. | 364/200 |
| 4,271,505 | 6/1981 | Menot et al. | 370/95 |
| 4,293,948 | 10/1981 | Soderblom | 370/90 |
| 4,445,214 | 4/1984 | Reynolds et al. | 370/85 |

FOREIGN PATENT DOCUMENTS

| | | |
|---|---|---|
| 0003849 | 2/1979 | European Pat. Off. . |
| 0005045 | 4/1979 | European Pat. Off. . |
| 2526249 | 11/1983 | France . |
| 2526250 | 11/1983 | France . |

OTHER PUBLICATIONS

Digest of Papers Compcon 82, 24th IEEE Computer Society International Conference (Feb. 22-25, 1982), I. Kong et al., "Cable-Net: A Local Area Network Reservation Scheme," pp. 182-186.
IEEE Electro, vol. 7, (May 1982), I. Kong. "Local Area Network—A Broadband Implementation," pp. 1-7.

Primary Examiner—Douglas W. Olms
Assistant Examiner—Wellington Chin
Attorney, Agent, or Firm—Oblon, Fisher, Spivak, McClelland & Maier

[57] ABSTRACT

A local area network in which a plurality of local equipments, each having one or more terminals connected thereto, are connected to different points of a common signal transmission path leading from a central equipment. The central equipment sends out data signals addressed to the local equipments to the common path on a time division basis. Each local equipment sends a data signal from the terminals to the central equipment in response to the reception of a self-addressed data signal from the central equipment. To avoid a collision or overspace between the data signals transmitted from local equipments the central equipment sends out control signals addressed to the local equipments in response to signals from the local equipments. Each local equipment controls the transmission start timing of the data signal to the central equipment in response to the self-addressed control signal.

17 Claims, 19 Drawing Figures

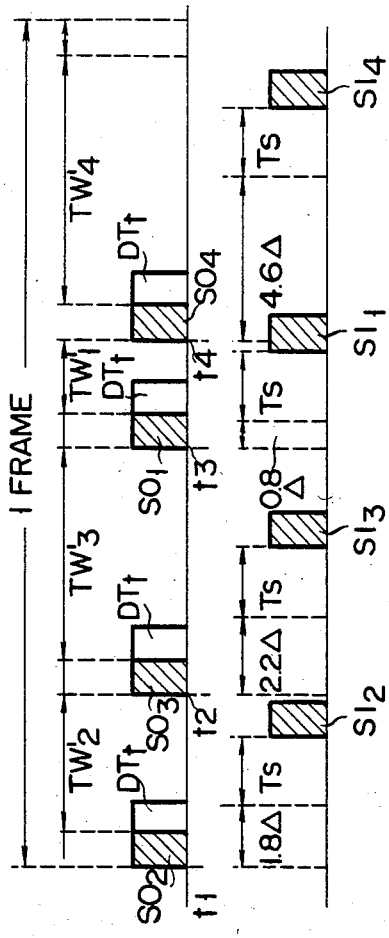
FIG. 4A
FIG. 4B
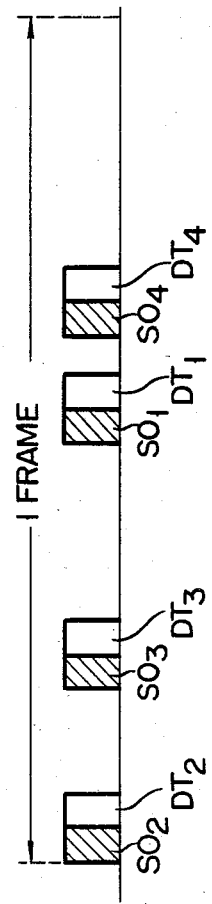
FIG. 5

F I G. 11
F I G. 12
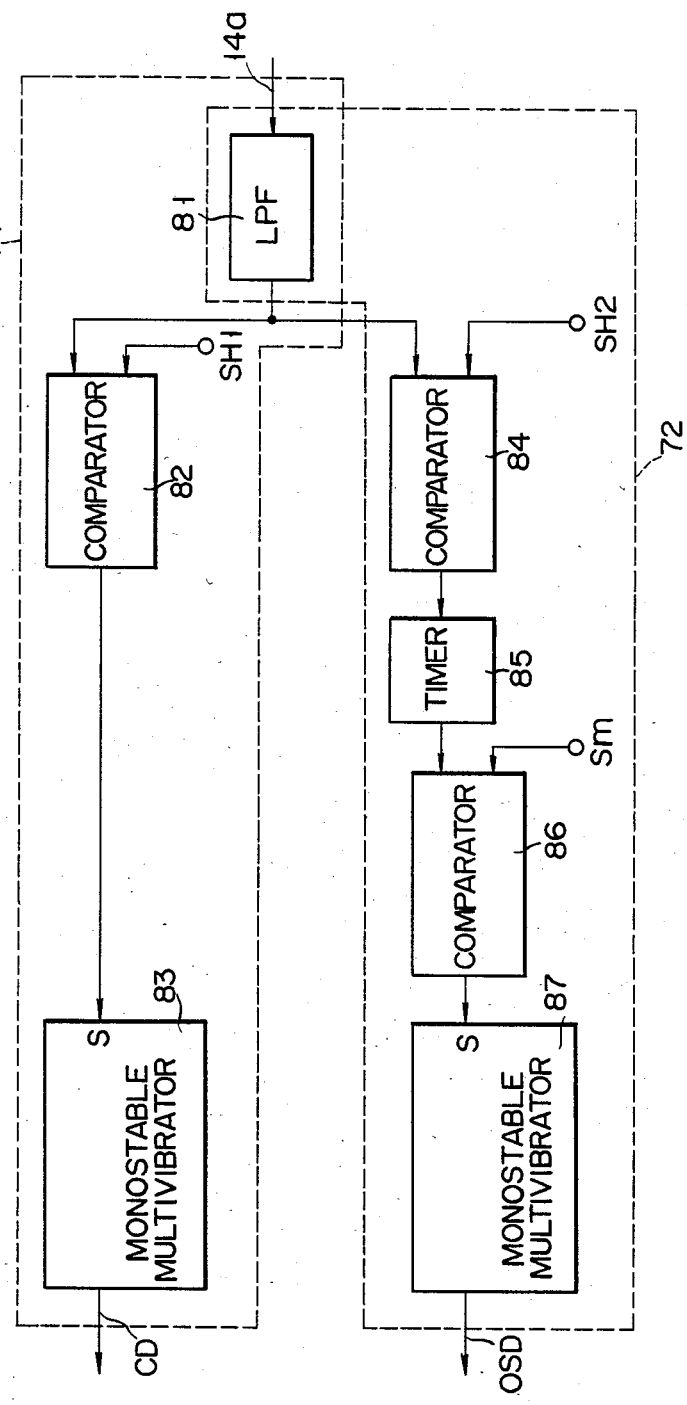

F I G. 16
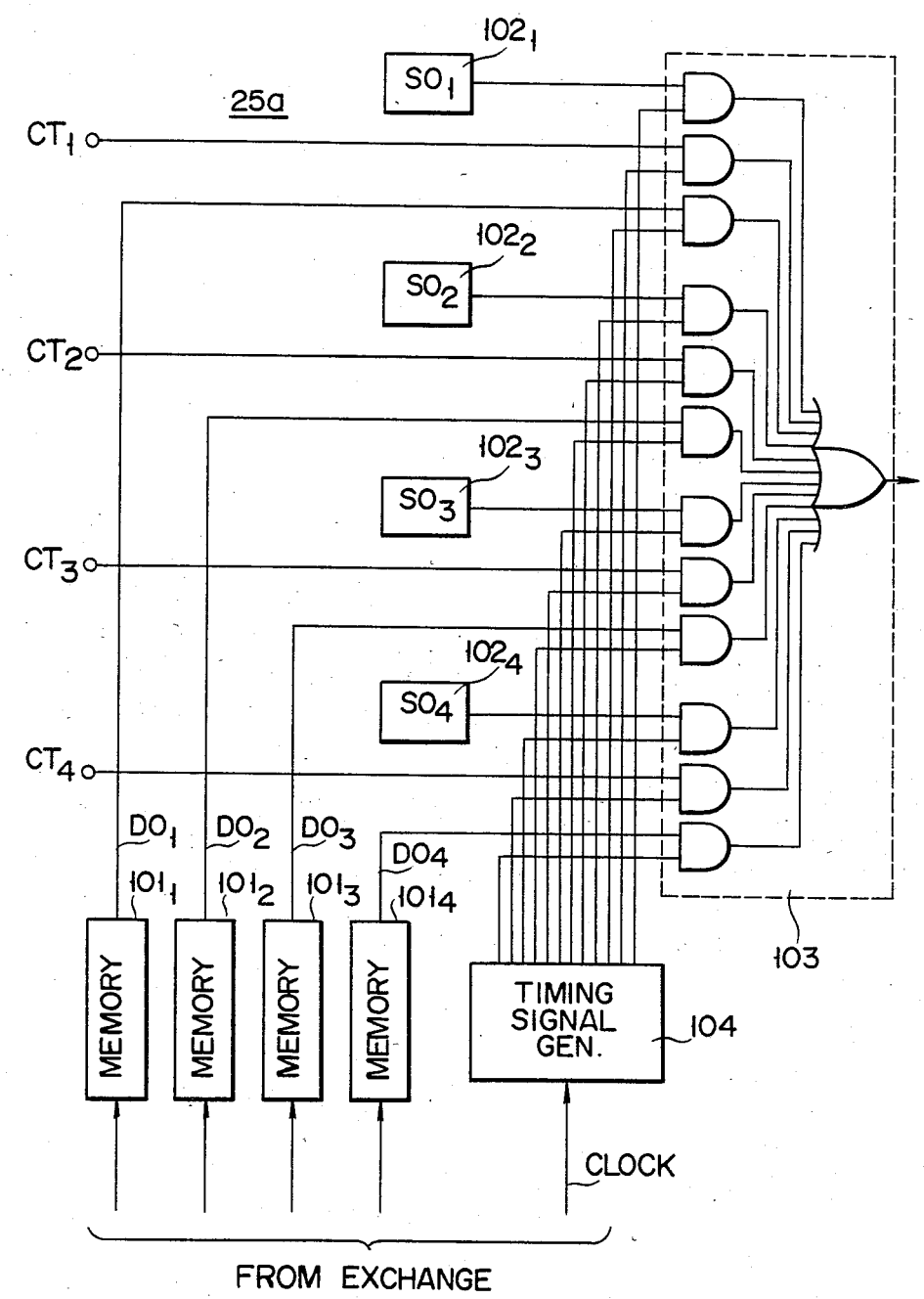

BUS-CONFIGURED LOCAL AREA NETWORK WITH DATA EXCHANGE CAPABILITY

BACKGROUND OF THE INVENTION

This invention relates to a local area network, and, more particularly, to a bus-configured local area network with data exchange capability.

With recent office automation, various electronic devices such as facsimiles and computers are extensively used, and there is a demand for a local area network with data exchange capability for terminals including electronic devices and telephone sets. However, it is very difficult to directly connect all terminals to a private branch exchange (PBX), as in an existing network using a PBX.

The difficulty can be alleviated by providing each area, such as a building or a building floor, with a local equipment to which terminals are connected. A simplified local-area network architecture may be realized by connecting each local equipment to a point of the bus wired from PBX, serving as a central equipment, instead of directly connecting each local equipment thereto. In such a bus-configured local-area network, signal transmission and reception is achieved by a time-division multiplexing system.

The bus-configured local-area network suffers from such a disadvantage as described below. Since the signal transmission time between the central equipment and each local equipment varies with the point at which the local equipment is connected to the bus, and the signal transmission and reception is done in a time-division manner, collision and overspace are liable to occur between signals sent from different local equipments to the central equipment. It is evident that the collision of signals is undesirable for signal transmission and reception. The overspace reduces signal transmission efficiency.

SUMMARY OF THE INVENTION

An object of the invention is to provide an improved bus-configured local area network.

Another object of the invention is to provide a bus-configured local area network in which a plurality of local equipments, to each of which one or more terminals are connected, are connected to respective points of a bus leading from a central equipment, and which is arranged to avoid collisions between signals sent out from the local equipments on the bus.

Still another object of the invention is to provide a bus-configured local area network in which a plurality of local equipments, to each of which one or more terminals are connected, are connected to respective points of a bus leading from a central equipment, and which is arranged to raise the signal transmission efficiency.

The local area network, to which the invention is directed, comprises a central equipment having an input and an output, a common signal transmission path one end of which is connected to the input and output of the central equipment, and a plurality of local equipments each having an input and output connected to a point on the common signal transmission path, to each of the local equipments one or more terminals are connected.

The central equipment is arranged to transmit signals addressed to individual local equipments on the common signal transmission path in a time division manner. Each of the local equipments is responsive to reception of the signal addressed thereto to transmit a data signal to the central equipment via the signal transmission path.

To attain the objects of the invention, the central equipment includes means for generating control signals addressed to respective local equipments in response to the reception of signals transmitted therefrom, the control signals being transmitted over the signal transmission path in a time division manner, and each local equipment includes means for controlling a transmission timing of a signal to be transmitted to the central equipment in response to the control signal addressed thereto.

BRIEF DESCRIPTION OF THE DRAWINGS

FIGS. 4A and 4B show test signals transmitted from the central equipment to local equipments, and respond signals transmitted from local equipments to the central equipment in response to the test signals in a test mode;

FIG. 5 shows transmission-start-timing control signals sent from the central equipment to local equipments in a transmission start-timing setting mode;

FIG. 11 shows the format of one word sent from the central equipment to each local equipment;

FIG. 12 is a block diagram of a collision detecting circuit and an overspace detecting circuit of FIG. 9;

FIG. 16 is a block diagram of the multiplexer of FIG. 9;

DETAILED DESCRIPTION OF THE PREFERRED EMBODIMENT

Figure 1:
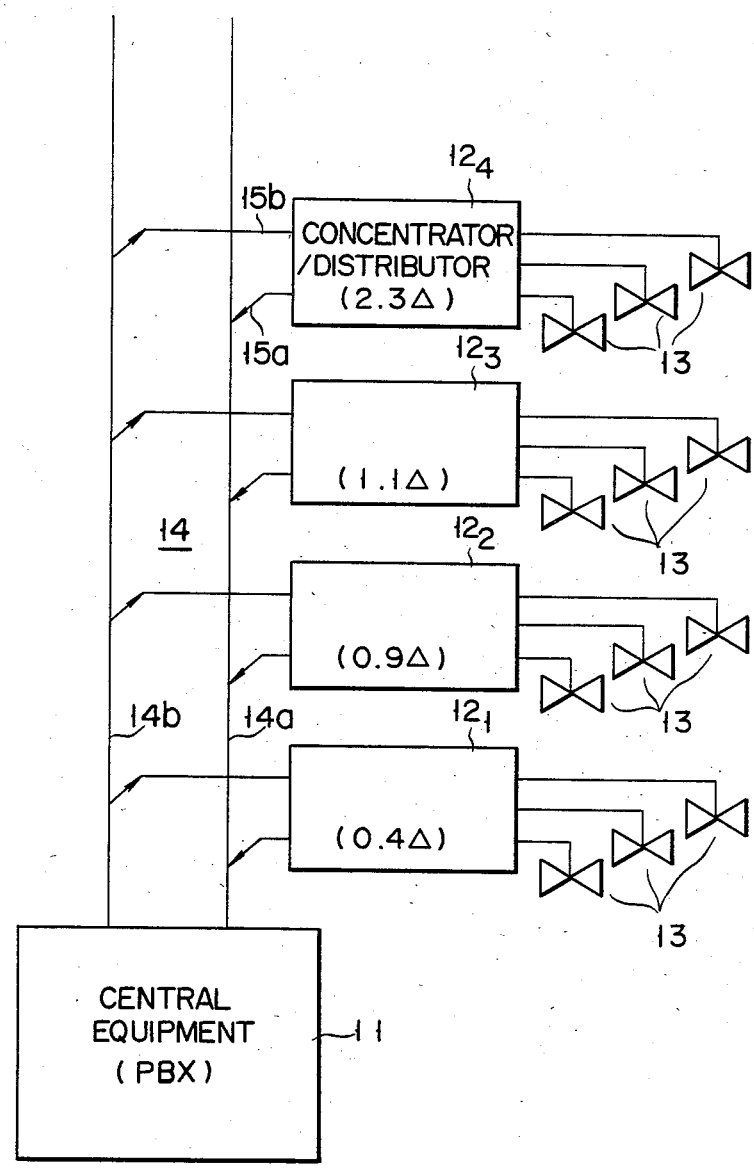
FIG. 1 is a schematic diagram of a bus-configured local-area network according to the invention.

Referring now to FIG. 1, a local area network according to the invention comprises a central equipment 11, a plurality of local equipments (concentrator/distributor) $12_1$ to $12_4$ and at least one terminal 13 connected to each local equipment. A common signal transmission path 14, consisting of an up link 14a and a down link 14b, is cabled from central equipment 11. An output line 15a and an input line 15b of each local equipment are connected to up and down links 14a and 14b, respectively. The terminals connected to the local equipments may be telephone sets, facsimiles or time-sharing system terminals, etc., or a combination of different kinds of terminals. The common signal transmission path 14 may be an optical signal transmission path, a baseband transmission path using coaxial cables, or a broadband transmission path (modulation transmission path) applied CATV techniques.

For the sake of simplicity, four local equipment $12_1$ to $12_4$ are connected to central equipment 11 in the illustrated positional relation. The local equipment $12_1$ is connected to path 14 at the nearest point thereof from central equipment 11, and the local equipment $12_4$ is connected to the common bus 14 at the remotest point from the central equipment 11. The signal transmission time between central equipment 11 and each local equipment depends on the position of the local equipment on signal transmission path 14.

The central equipment 11 is capable of permitting data exchange between terminals. If the terminals are all telephone sets, it is a private branch exchange (PBX) in the ordinary sense. Each local equipment multiplexes signals from the terminals on a time division basis and sends out the multiplexed signals on up link 14a together with a synchronizing signal containing address information identifying the local equipment. The multiplexed signals sent out from each local equipment constitute one word. The length of one word depends on the number and type of terminals connected to each local equipment.

The central equipment 11 receives words transmitted from the local equipments and performs exchanges of the received data according to subscriber data. It also transmits, after data exchange, words addressed to the local equipments on down link 14b in a predetermined sequence previously allocated to the local equipments within one frame time. The time length of one frame depends on the number of local equipments, and the number and type of terminals.

Each local equipment receives self-addressed word identified by the work sync signal to distribute the received data to the corresponding terminals. Each local equipment is arranged to send out a new word after the reception of the self-addressed word from the central equipment. For the transmission of data either a baseband transmission system or a carrier-modulating transmission system may be used.

In the local area network of FIG. 1 as summarized above, the signal transmission time between central equipment 11 and a local equipment varies with the position of the latter. Therefore, sending a new word on up link 14a from a local equipment, in response to the reception of a word from the central equipment, may cause a collision with a word from another local equipment. According to the invention, the start timing for word transmission from each local equipment is controlled in such a manner as to avoid such a collision between words, and also to minimize a space between words as will be described in detail hereafter.

Figure 2:
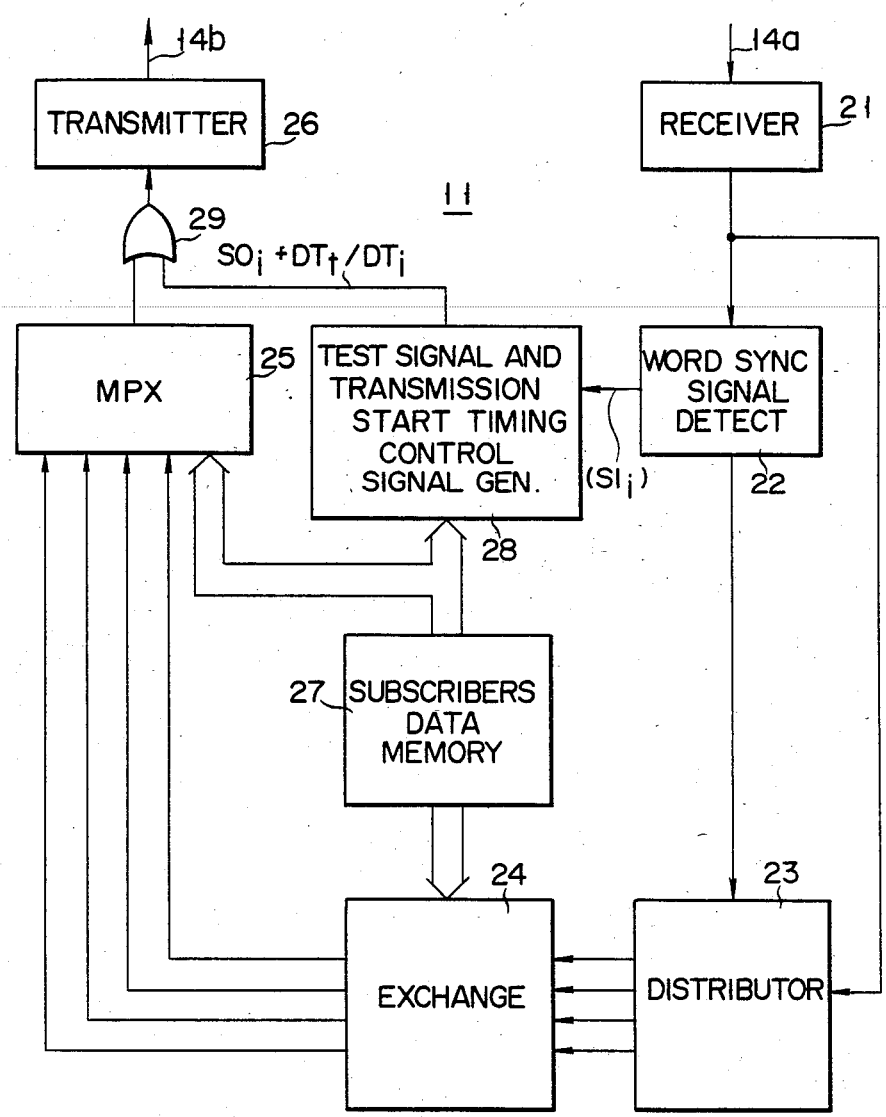
FIG. 2 is a block diagram of a central equipment according to a first embodiment of the invention.

Referring to FIG. 2 the central equipment according to an embodiment of the invention is shown, which comprises a receiver 21, a word-sync signal-detecting circuit 22, a distributor 23, an exchange 24, a multiplexer 25, a transmitter 26, a subscriber's data memory, and a test signal and transmission start-timing control-signal generator 28.

The receiver 21 receives a signal transmitted from each local equipment via up link 14a and decodes the received signal into a logic data signal. The logic data signal is applied to word-sync signal-detecting circuit 22, which detects a word sync signal $SI_i (i=1, 2, 3$ or $4)$, indicating the local equipment which generated the received signal. The logic data signal is also applied to distributor 23. The distributor 23 is responsive to word-sync detecting circuit 22 to convert signals serially transmitted from local equipments $12_1$ to $12_4$ to parallel signals corresponding to the respective local equipments. The parallel signals are applied to exchange 24 in which data exchange processing is performed in a known manner according to subscriber data provided by subscriber data memory 27. The subscriber data includes address information (i.e., word sync signal) $SO_i$ for identifying the local equipments and data TWi representing the number of terminals connected to each local equipment (which determines the length of one word allotted to the corresponding local equipment $12_i$).

The exchange 24 provides signals, addressed to the respective local equipments $12_1$ to $12_4$, in parallel, which are applied to multiplexer 25 together with the subscriber data $SO_i$. The multiplexer 25 adds corresponding subscriber data SOi, as a word sync signal, to data signals addressed to the local equipment $12_i$ and applies to transmitter 26 words addressed to the respective local equipments at predetermined timings in a time division manner. The transmitter 26 transmits these words on down link 14b in a form suited for transmission. Clock pulses are superimposed on the transmission signals to establish synchronization between the central equipment and each local equipment.

The control signal generating circuit 28 is provided for avoiding collisions between signals transmitted from local equipments. The circuit 28 operates in a test mode and a transmission start timing-setting mode prior to the normal data transmission mode. In the test mode, it generates test signals addressed to the respective local equipments to measure, for each local equipment, a time difference (i.e., delay time) between the instant of transmission of a test signal from the central equipment 11 and the instant of reception by central equipment 11 of a responding signal transmitted from a local equipment in response to the self-addressed test signal. In the transmission-start timing-setting mode, the circuit 28 calculates, for each local equipment, control data for setting the transmission start timing on the basis of the measured delay time and provides the control data addressed to the respective local equipments.

In this embodiment, the test signal, transmitted from the central equipment to each local equipment in the test mode, consists of a word sync signal $SO_i$ and a common test control signal $DT_t$. On the other hand, the responding signal, transmitted from each local equipment to the central equipment in response to the self-addressed test signal, consists of a word sync signal $SI_i$. The signal, transmitted from the central equipment to each local equipment in the transmission start timing-setting mode, consists of word sync signal $SO_i$ and control data $DT_i$. In both the test mode and transmission-start timing-setting mode, an output signal of circuit 28 is applied to transmitter 26 through an OR gate 29.

Figure 3:
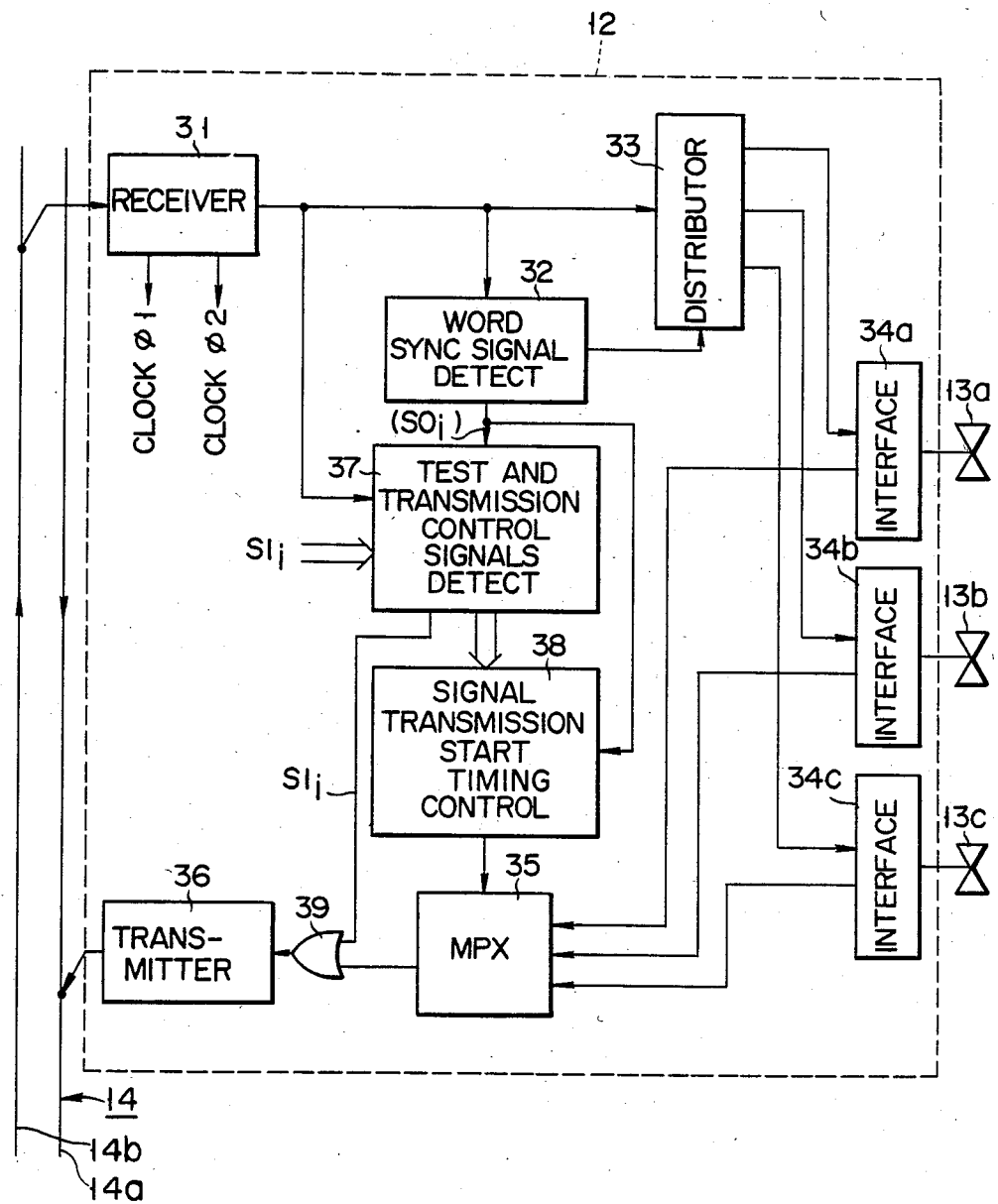
FIG. 3 is a block diagram of a local equipment according to the first embodiment of the invention.

Referring to FIG. 3 an example of the local equipment is shown which comprises a receiver 31, a word sync signal detecting circuit 32, a distributor 33, interfaces 34a to 34c, a multiplexer 35, a transmitter 36, a test signal and transmission-start timing signal detecting circuit 37, and a transmission-start timing-control circuit 38.

The receiver 31 receives a signal transmitted from central equipment 11 via down link 14b to decode it into a logic data signal. Simultaneously, clock signals $\phi_1$ and $\phi_2$ are recovered. The word sync signal-detecting circuit 32 detects the word sync signal $SO_i$ from the logic data signal. When the word sync signal $SO_i$ is detected, the distributor 33 receives the succeeding data signal $DO_i$ to separate signals addressed to the respective terminals 13a to 13c, which are time-division multiplexed in a predetermined order. The separated data signals are distributed to the corresponding terminals 13a to 13c through interfaces 34a to 34c. Where each terminal is a telephone set, each interface may include a digital-to-analog converter for converting a digital signal supplied from distributor 33 into an analog signal, an analog-to-digital converter for converting an analog voice signal into a digital signal, and a hybrid transformer.

The multiplexer 35 time-division multiplexes digital signals from interfaces 34a to 34c in a predetermined order, and adds the word sync signal $SI_i$ to the multiplexed signals. An output signal of multiplexer 35 is transmitted on up link 14a through transmitter 36. In this embodiment, time slots allocated to respective signals from terminals are equal in length.

As described above, according to the invention, the signal transmission start timing in each local equipment, i.e., the start timing in operation of multiplexer 35, is controlled. For this purpose, the control signal detecting circuit 37 and transmission-start timing-control circuit 38 are provided. In the test mode, in response to the detection of a word sync signal by the word-sync signal-detecting circuit 32, the control signal detecting circuit 37 detects the test control signal succeeding to the word sync signal to immediately supply the word sync signal $SI_i$ through an OR gate 39 to transmitter 36. On the basis of this signal $SI_i$, the central equipment 11 measures the delay time for the corresponding local equipment $12_i$. After the measurement of all the delay times for the local equipments has been completed, the central equipment calculates the control data for each local equipment. In the transmission-start timing-setting mode, the control signal detecting circuit 37 detects the control data in response to the detection of the word sync signal. The detected control data is applied to transmission-start timing-control circuit 38. The control circuit 38 renders the multiplexer 35 operative at a time when the time length, represented by the control data, elapses from the time of detection of the word sync signal by word-sync signal-detecting circuit 32.

The above operation will now be described in more detail. It is now assumed that the signal transmission times from central equipment 11 to the respective local equipments $12_1$ to $12_4$ (i.e., delay times) are respectively $0.4\Delta$, $0.9\Delta$, $1.1\Delta$ and $2.3\Delta$. $\Delta$ stands for a proper clock time (for example, the time length of eight clock pulses). The time lengths $TW'_1$ to $TW'_4$ of data signals of the words allocated to local equipments $12_1$ to $12_4$ are set according to the subscriber data $TW_i$. When a transmission sequence of words $WO_1$ to $WO_4$ from the central equipment $12_1$ to $12_4$ within one frame is set, the timing of each word transmission is determined. The test signals are transmitted to the corresponding local equipments at the same timings as for corresponding words within one frame.

As shown in FIG. 4A, for example, the transmission timings of test signals addressed to local equipments $12_2$, $12_3$, $12_1$, $12_4$ are set to $t_1$, $t_2$, $t_3$, $t_4$, respectively, within one frame. The test signal consists of word sync signal $SO_i$ and test control signal $DT_t$, as described before. The length of time of the test control signal is set to be considerably shorter than the length of time of the data signal of one word. Therefore, after a test signal is transmitted, the central equipment receives a responding signal to the transmitted test signal before the next test signal is transmitted. The test control signal $DT_t$ is formed of a bit stream of, for instance, "01111111".

In view of the time delay $TD_i$, i.e., time required for transmission of a signal from the central equipment to each local equipment, central equipment 11 receives, for instance, the word sync signal $SI_2$ as a responding signal to the test signal, transmitted at the time $t_1$ to local equipment $12_2$, after the time delay $(0.9\Delta \times 2 + Ts)$ as shown in FIG. 4B; where Ts is the processing time in each local equipment from the reception of the test signal to the transmission of the responding signal. Likewise, it receives the responding signals $SI_3$, $SI_1$ and $SI_4$ from the local equipments $12_3$, $12_1$ and $12_4$ after the time delays $(1.1\Delta \times 2 + Ts)$, $(0.4\Delta \times 2 + Ts)$ and $(2.3\Delta \times 2 + Ts)$, respectively. The central equipment measures the time delay $(2TD_i + Ts)$ for each local equipment and detects the maximum time delay $(2TDmax + Ts)$. In this example, the maximum time delay is $(4.6\Delta + Ts)$ for the local equipment $12_4$. In this embodiment, the transmission start times of local equipments $12_1$ to $12_4$ are controlled such that the time delays for the local equipments become all $(2TDmax + Ts)$. To this end, the central equipment 11 calculates the difference $DT_i$ between the maximum time delay $(2TDmax + Ts)$ and the time delay $(2TD_i + Ts)$ peculiar to each local equipment, depending on the position thereof, and sends $DT_i$ as control data to corresponding local equipment. The control data $DT_i$ is represented by "0xxxxxxx". The first bit "0" in the test control signal $DT_t$ and control data $DT_i$ is provided for distinguishing the succeeding bits from the normal data of a word. The seven bits represented by "x" ("1" or "0") of the control data, represents an extra time delay to be added to the peculiar time delay of each local equipment. In this example, the extra time delays for the local equipments $12_1$ to $12_4$ are $3.8\Delta$ $(=4.6\Delta - 0.4\Delta \times 2)$, $2.8\Delta$ $(=4.6\Delta - 0.9\Delta \times 2)$, $2.4\Delta$ $(=4.6\Delta - 1.1\Delta \times 2)$ and $0$ $(=4.6\Delta - 2.3\Delta \times 2)$. The control data $DT_i$ thus calculated is sent from transmitter 26 together with the corresponding word sync signal $SO_i$ at the same timing as the test signal, as shown in FIG. 5. Each local equipment controls the transmission start time according to the corresponding control data transmitted from central equipment 11. As a result, the difference between the transmission time of a word at the central equipment and the reception time of a corresponding responding word at the central equipment becomes same with respect to all the local equipments.

Figure 6:
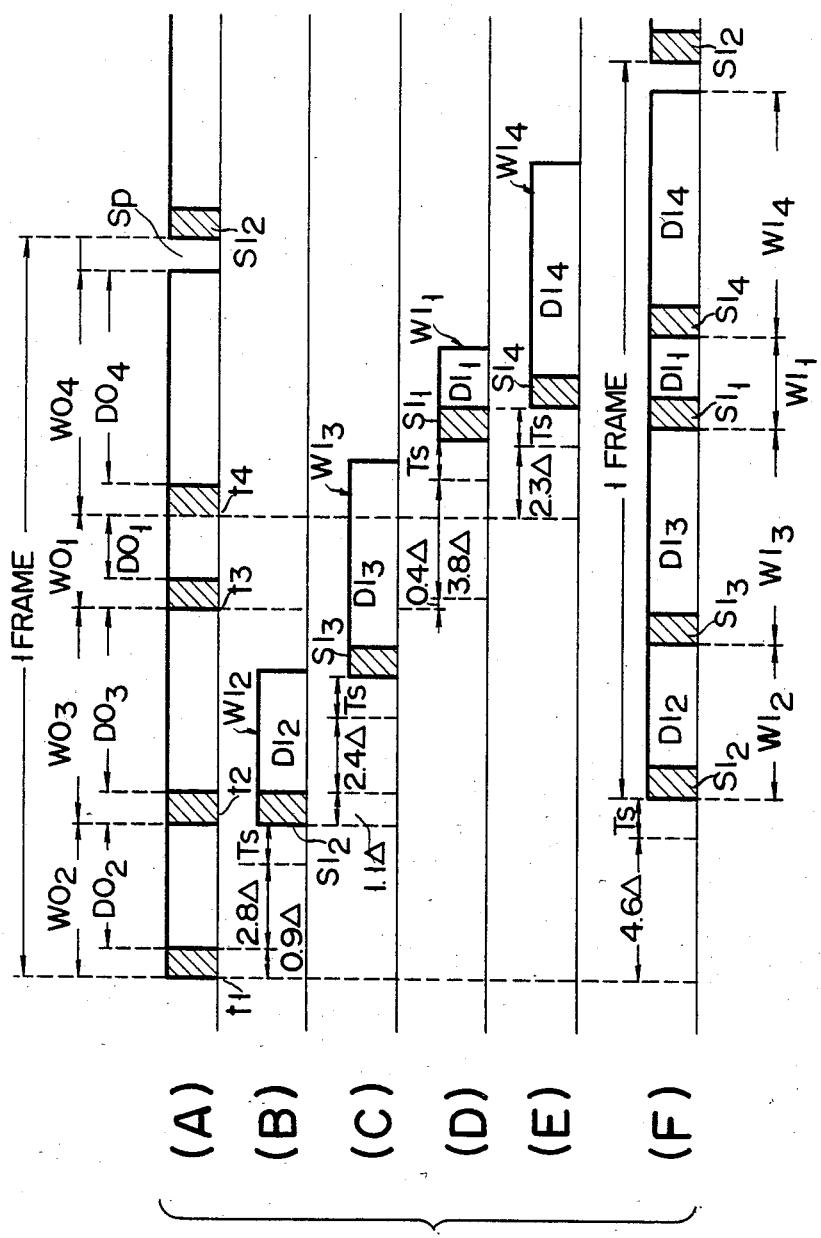
FIG. 6 is a time chart for explaining the operation of the first embodiment of the invention.

By setting the time delay of each local equipment in the signal transmission as described above, efficient word transmissions from the local equipments in the normal data transmission mode can be performed. This will be described in detail with reference to the time chart of FIG. 6. The data signal $DO_i$, $DI_i$ of each word is formed of "1xxx . . . x".

It is assumed that words $WO_2$, $WO_3$, $WO_1$ and $WO_4$ are sent to local equipments $12_2$, $12_3$, $12_1$ and $12_4$ at times $t_1$, $t_2$, $t_3$ and $t_4$, as shown in FIG. 6A. As shown in FIG. 6B, the word $WO_2$ reaches receiver 31 of local equipment $12_2$ after the lapse of a signal propagation time of $0.9\Delta$, and then, after the lapse of Ts a responding word $WI_2$ is produced by multiplexer 35. The signal transmission from multiplexer 35 is delayed by a time of $2.8\Delta$. Therefore, the responding word $WI_2$ appears on up link 14a with a time delay of $(0.9\Delta+2.8\Delta+Ts)$ after $t_1$. Likewise, responding words $WI_3$, $WI_1$ and $WI_4$ appear on up link 14a with time delays of $(1.1\Delta+2.4\Delta+Ts)$, $(0.4\Delta+3.8\Delta+Ts)$ and $(2.3\Delta+Ts)$, respectively, as shown in FIGS. 6C, 6D and 6E. These responding words $WI_2$, $WI_3$, $WI_1$, $WI_4$ on up link 14a arrive at receiver 21 in central equipment 11 with time delays of $0.9\Delta$, $1.1\Delta$, $0.4\Delta$ and $2.8\Delta$, respectively. That is, times of $(0.9\Delta \times 2+2.8\Delta+Ts)$, $(1.1\Delta \times 2+2.4\Delta+Ts)$, $(0.4\Delta \times 2+3.8\Delta+Ts)$ and $(2.3\Delta \times 2+Ts)$ are required from the transmissions of the respective words $WO_2$, $WO_3$, $WO_1$ and $WO_4$ at central equipment 11 till the receptions of the responding words $WI_2$, $WI_3$, $WI_1$ and $WI_4$ at central equipment 11. In other words, the responding words $WI_2$, $WI_3$, $WI_1$ and $WI_4$ arrive at central equipment 11 with the time delay of $(4.6\Delta+Ts)$ after the transmissions of the corresponding words $WO_2$, $WO_3$, $WO_1$ and $WO_4$, as shown in FIG. 6F. It will be understood, therefore, that words can be reliably and efficiently transmitted from local equipments $12_1$ to $12_4$ to central equipment 11 without the possibility of collisions or overspaces between words.

In order to reliably avoid signal collisions due to possible variations of time delays in the signal transmission path and local equipment, a time space of about $0.1\Delta$ may be provided between words transmitted from the local equipments. In this embodiment, a space Sp is provided at the end of each frame to facilitate distinguishing between frames. The space Sp, however, may be omitted, because frames can be distinguished by the previously known word sync signal of the first word in the frame. In this embodiment, the maximum time delay $(2TDmax+Ts)$ among the delay times associated with the local equipments is found, by the maximum time delay may be previously determined to be longer than $(2TDmax+Ts)$.

Figure 7:
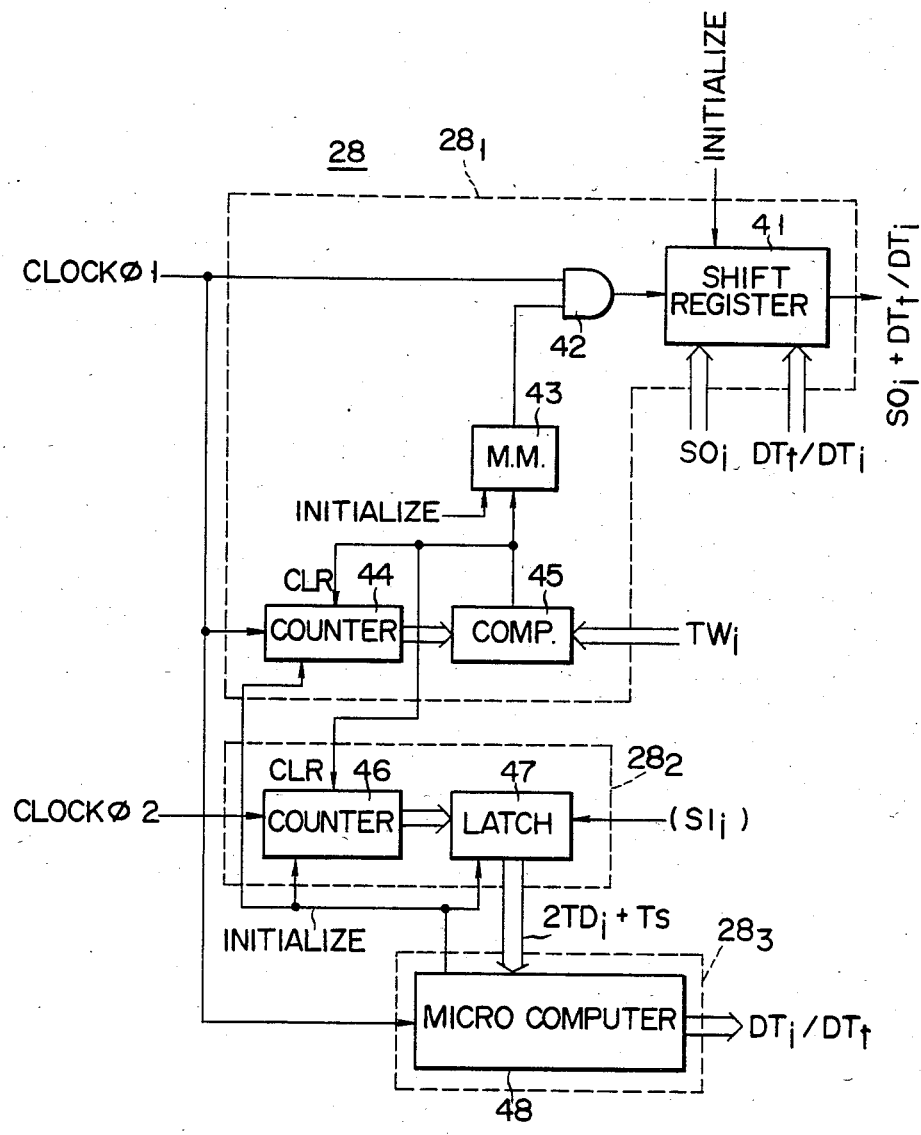
FIG. 7 is a block diagram showing a test signal and transmission start timing-control-signal generating circuit of FIG. 2.

Now, an embodiment of control-signal generating circuit 28 will be described with reference to FIG. 7. The circuit 28 includes control signal sending means $28_1$, delay time measuring means $28_2$ and test signal/transmission-start time control-signal generating means $28_3$. The clock $\phi_2$ has, for example, about 10 times the frequency of clock $\phi_1$. The control-signal sending means $28_1$ has a shift register 41. In the test mode, subscriber data (word sync signal) $SO_i$ from subscriber data memory 27 and test control signal $DT_t$ from generating means $28_3$ are loaded into shift register 41 at the transmission time of the word $WO_i$ to local equipment $12_i$. The test signal $(SO_i+DT_t)$, loaded in shift register 41, is read out bit by bit by clock pulses $\phi_1$ supplied through an AND gate 42, which is enabled by a monostable multivibrator 43 whose output goes high for a period of time equal to the test signal. A counter 44 and a comparator 45 are provided for measuring the length of time of word $WO_i$ and triggering monostable multivibrator 43. The counter 44 counts clock pulses $\phi_1$ whose count value is compared, by comparator 45, with the subscriber data $TW_i$ from subscriber data memory 27. The subscriber data $TW_i$ represents the length of time of word $WO_i$, which depends on the number and type of terminals 13 connected to local equipment $12_i$. When the count of counter 44 coincides with subscriber data $TW_i$, the comparator 45 triggers monostable multivibrator 43 and clears counter 44. The monostable multivibrator 43 is arranged to, when triggered, provide a high level output during the period of time necessary for transmission of the test signal.

The time delay measuring means $28_2$ includes a counter 46 and a latch 47. The counter 46 counts clock pulses $\phi_2$ and is cleared by comparator 45. The count of counter 46 is latched in latch 47 in response to a detection signal $(SI_i)$ of word-sync signal-detecting circuits 2 for word sync signal $SI_i$ from local equipment $12_i$. Since counter 46 is cleared at the same time that monostable multivibrator 43 is triggered by comparator 45, the count of counter 46, latched in latch 47, represents the time interval from the transmission of the test signal $(SO_i+DT_t)$ until the reception of the word sync signal $SI_i$, i.e., the time delay $(2TD_i+Ts)$ associated with local equipment $12_i$.

The content of latch 47 representing the measured delay time is fed to a microcomputer 48, which constitutes control signal generating means $28_3$. The microcomputer 48 detects the maximum time delay $(2TDmax+Ts)$ among the time delays measured for local equipments $12_1$ to $12_4$ and then calculates the control data $DT_i$ for each local equipment $12_i$, as stated above.

In the transmission-start time-setting mode, the calculated control data $DT_i$ is loaded into shift register 41 together with the word sync signal $SO_i$, as in the case of the test control signal $DT_t$, and then sent out therefrom.

At the beginning of the test mode and transmission-start time-setting mode, shift register 41, monostable multivibrator 43, counters 44 and 46, and latch 47 are initialized by microcomputer 48. When initialized, monostable multivibrator 43 provides a high level output for a predetermined period of time. The subscriber data $SO_i$, $TW_i$, test control signal $DT_t$, and control data $DT_i$ are supplied to control signal sending means $28_1$ at predetermined times $(t_1, t_2, t_3, t_4)$ under the control of microcomputer 48.

Figure 8:
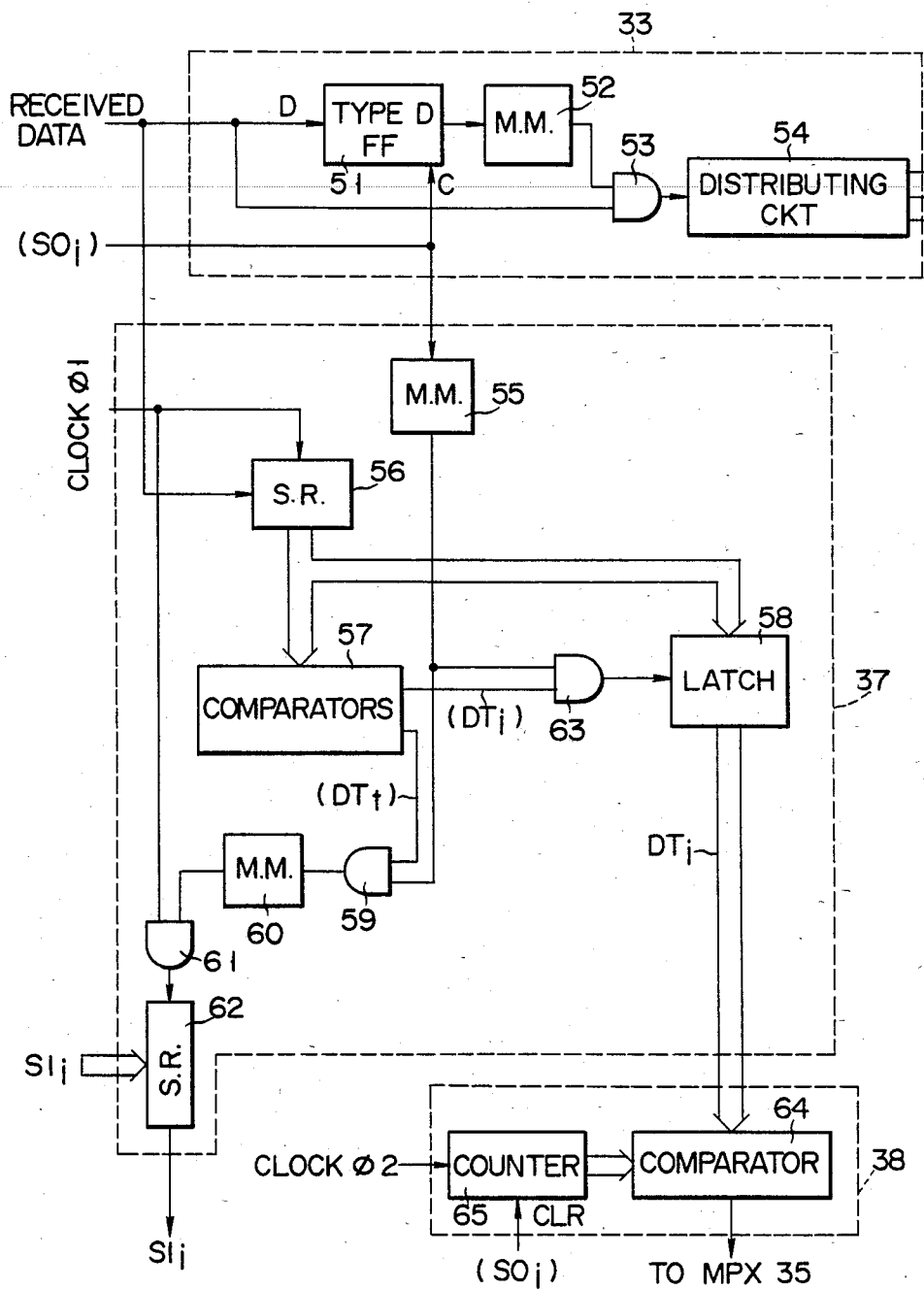
FIG. 8 is a block diagram of a distributor, a test signal, a transmission-start timing-control-signal detecting circuit, and a transmission-start timing-control circuit of FIG. 3.

Referring to FIG. 8, the distributor 33, control signal detecting circuit 37 and transmission-start timing-control circuit 38 will be described hereinbelow.

In each local equipment, it is necessary to discriminate between normal data "1xxx . . . x" and control signal "01111111" or "0xxxxxxx". The distributor 33 is arranged to receive only data "xxx . . . x" by making use of a bit "1" following the word sync signal. It includes a type-D flip-flop 51, which receives received data at its data input and is clocked by a word-sync signal-detection signal $(SO_i)$. When a word sync signal $SO_i$ is detected in the normal data transmission mode, the flip-flop 51 provides at its output the bit "1", following the word sync signal, to trigger monostable multivibrator 52.

When triggered, the multivibrator 52 is arranged to provide a high-level output to enable an AND gate 53 for a length of time of the word data part $DO_i$. Thus, when a word sync signal $SO_i$ is detected in the transmission mode, the following data "xxx . . . x" is supplied through AND gate 53 to distributing circuit 54. In the case of the control signal, the bit following the word sync signal $SO_i$ is "0". Thus, in this case, the monostable multivibrator 52 is not triggered and the control signal is not supplied to distributing circuit 54.

The control signal detecting circuit 37 includes a monostable multivibrator 55 and a shift register 56, which respectively receive the sync signal detection signal (SO$_i$) and received data from receiver 31. The monostable multivibrator 55 is triggered by the detection signal (SO$_i$) and, as a result, its output goes high for the length of time of the control signal DT$_t$ or DT$_i$. The shift register 56 is clocked by clock pulses $\phi_1$ to read in the received data serially and read out in parallel. The output of shift register 56 is coupled to comparators 57 and also to a latch 58. The comparators 57 compares an output signal of shift register 56 with the test control signal "01111111" and control data "0xxxxxx" to provicde coincidence signals (DT$_t$) and (DT$_i$). The coincidence signal (DT$_t$), which is obtained when the output signal of shift register 36 coincides with the test control signal DT$_t$, triggers a monostable multivibrator 60 through an AND gate 59, which is enabled by monostable multivibrator 55. Thus, the output of multivibrator 60 goes high to enable an AND gate 61 for the length of time of the word sync signal SI$_i$. During this time, clock pulses $\phi_1$ are supplied through AND gate 61 to a shift register 62. The shift register 62 receives the bits of the word sync signal SI$_i$ in parallel and sends out them serially in response to clock pulses $\phi_1$. Thus, it is understood that, in the test mode, when each local equipment 12$_i$ receives the test signal SO$_i$+DT$_t$, it sends out the word sync signal SI$_i$ as a responding signal to the central equipment 11.

When the output signal of shift register 56 coincides with the control data DT$_i$ "0xxxxxx" in the transmission-start timing-setting mode, the comparators 57 provides the coincidence signal (DT$_i$), which is fed through an AND gate 63 to latch 58, whereby the output signal shift register 56 is latched in latch 58. The detection of the control data DT$_i$ in comparators 57 can be performed on the basis of a fact that the first bit of control data DT$_i$ is "0", and the remaining bits always include at least one bit "0".

The control data DT$_i$ latched in latch 58 is fed to a comparator 64 in transmission-start timing-control circuit 38. The circuit 38 also includes a counter 65, which counts clock pulses $\phi_2$ and is cleared by the word-sync signal-detection signal (SI$_i$). The comparator 64 compares the count of counter 65 with control data DT$_i$. When a coincidence occurs, the comparator 64 produces an output signal to actuate multiplexer 35. As a result, the transmission of signal is started. It will be understood, therefore, that, in the normal data transmission mode, the signal transmission is started after the time represented by the control data DT$_i$ latched in latch 58 in the transmission-start timing-setting mode has been passed from a point of time at which the word sync signal SO$_i$ is detected.

Now, another embodiment of the invention will be described. In this embodiment, the central equipment checks whether there is any collision or overspace between words transmitted from local equipments and adds corresponding control signals to words to be sent to the local equipments. As a result, in each local equipment, the signal transmission timing is controlled such that neither collision nor overspace occurs between words from local equipments.

Figure 9:
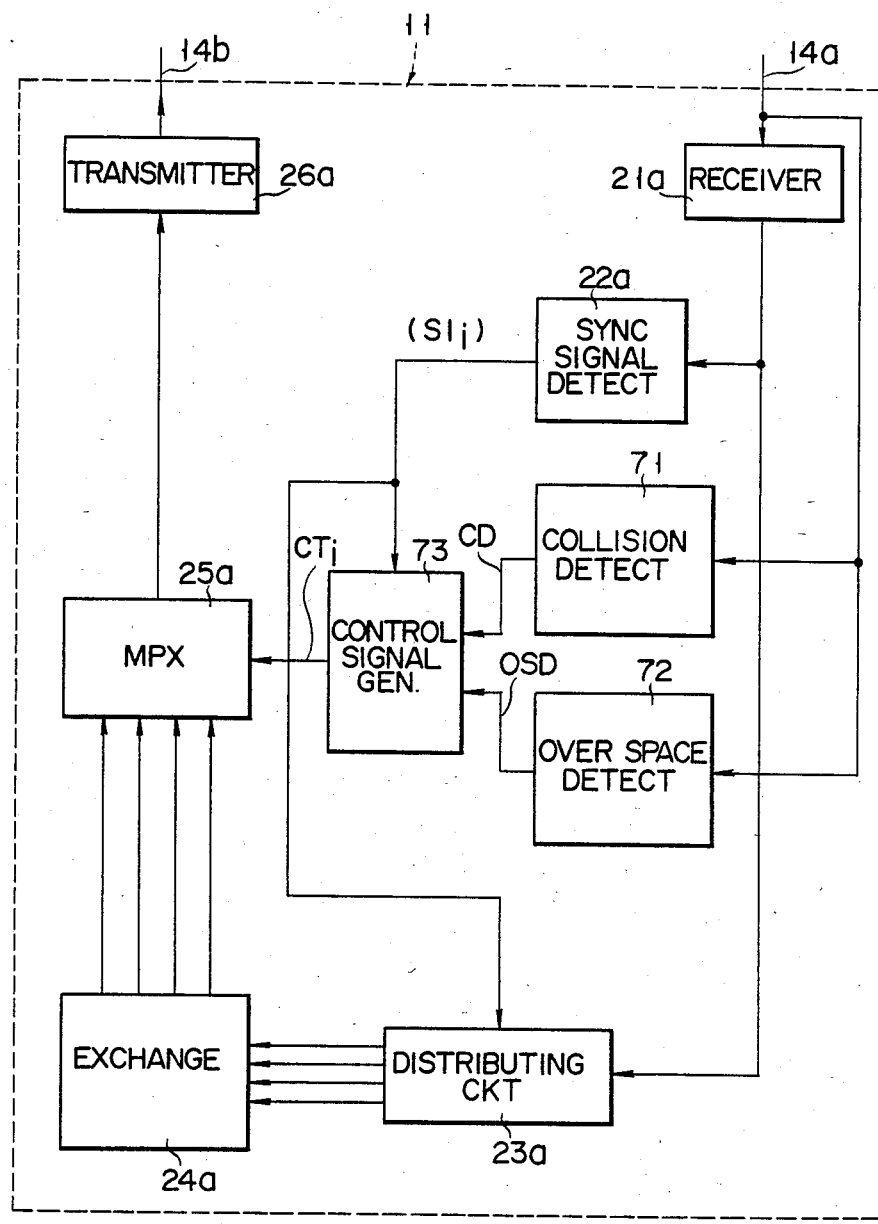
FIG. 9 is a block diagram of a central equipment according to a second embodiment of the invention.

FIG. 9 shows an arrangement of the central equipment in this embodiment. Like parts, as in the central equipment in the preceding embodiment shown in FIG. 2, are designated by the same reference numerals with a suffix a.

Signals transmitted over up link 14$a$ by local equipment 12$_1$ to 12$_4$ are applied to a receiver 21$a$, a collision detecting circuit 71, and an overspace detecting circuit 72. The collision detecting circuit 71 detects collisions between words from local equipments 12$_1$ to 12$_4$ according to a change in the level of a signal transmitted over up link 14$a$, which results from a collision as will be described later. The circuit 71 is arranged to, when detecting a collision, produce an output of "1". The overspace detecting circuit 72 detects an overspace between words from local equipments, and produces an output of "1" upon detection of an overspace. The collision-detection signal CD of circuit 71 and overspace-detection signal OSD of circuit 72 are applied to a control-signal generating circuit 73, together with a word sync signal detecting signal (SI$_i$) of word-sync signal-detecting circuit 22$a$. The control signal generating circuit 73 produces a control signal CT$_i$ which is applied to a multiplexer 25$a$. The control signal CT$_i$ is a 2-bit signal consisting of the collision detection signal CD and overspace detection signal OSD. The multiplexer 25$a$ time-division multiplexes words addressed to local equipments. The words transmitted to local equipments each have a format as shown in FIG. 11, consisting of a word sync signal SO$_i$ stored in multiplexer 25$a$, a control signal CT$_i$ from control-signal generating circuit 73, and data signal DO$_i$ from exchange 24$a$. The words, transmitted from the local equipments to the central equipment, each consist of a word sync signal SI$_i$ and data signal DI$_i$, as in the previous embodiment. The time-division multiplexed words for the local equipments constitute one frame. The word sequence in the frame is predetermined. Therefore, it is possible for each local equipment to receive a self-addressed word by arranging a frame sync signal FSY at the head of the frame instead of adding a word sync signal to each word.

Figure 10:
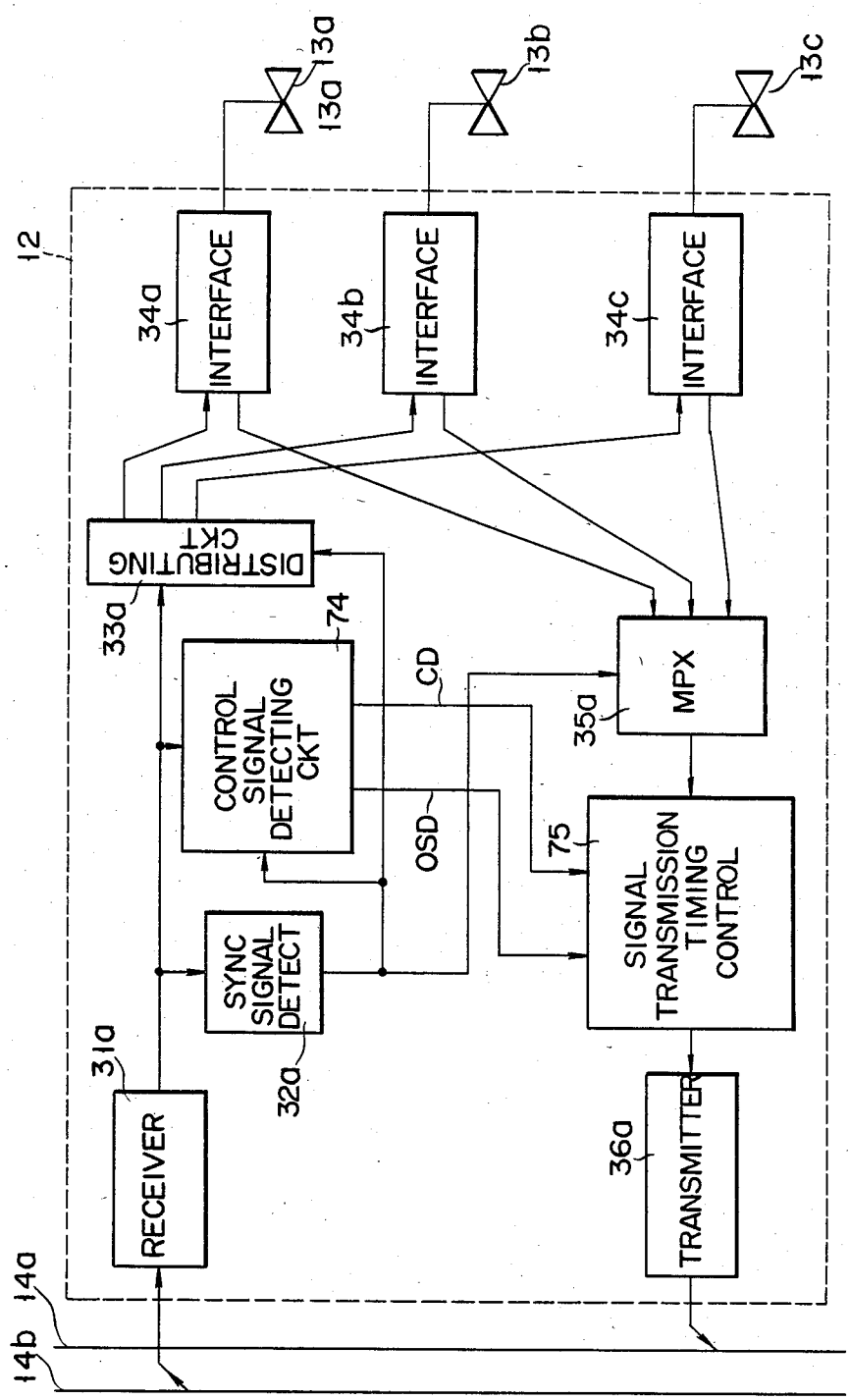
FIG. 10 is a block diagram of a local equipment in the second embodiment.

FIG. 10 shows a structure of the local equipment. A control signal detecting circuit 74 is provided which is responsive to the detection of the word sync signal SO$_i$ by sync signal detecting circuit 32$a$ to detect the control signal CT$_i$ succeeding to the sync signal. The detected control signal CT$_i$ is supplied to a transmission start-timing control circuit 75, which is connected between multiplexer 35$a$ and transmitter 36$a$. In response to the detection of the word sync signal SO$_i$ by sync signal detecting circuit 32$a$, the multiplexer 35$a$ starts the time-division multiplexing of signals from terminals 13$a$ to 13$c$ to supply the signal to transmission start-time control circuit 75.

The transmission start-time control circuit 75 controls the start-time of signal supply from mutliplexer 35$a$ to transmitter 36$a$ in response to the detected control signal CT$_i$. In other words, the control circuit 75 controls a delay time T$_i$ from a point of time when the word sync signal is detected to a point of time when the word is actually transmitted from transmitter 36$a$ over up link 14$a$. In transmission-start timing-control circuit 75 of each local equipment, a common initial value of the delay time T$_i$ is set. When the control signal CT$_i$ from control signal detecting circuit 74 is indicative of a collision, the control circuit 75 increases the delay time T$_i$ retard the transmission of a corresponding word. On the other hand, when the control signal CT$_i$ is indicative of an overspace, it reduces the delay time T$_i$ to advance the transmission of the corresponding word. When the control signal CT$_i$ is indicative of neither collision nor overspace, the delay time T$_i$ is held at the initial value.

When a collision between two words on the up link 14$a$ is detected in the central equipment, the word sync signal of the preceeding word can be detected, while the word sync signal of the succeeding word cannot be detected. However, since the sequence of words in one frame can be known, the control signal $CT_i$ indicative of a collision occurrence can be added to a word addressed to the local equipment, which transmitted the succeeding word in collision. Thus, the delay time $T_i$ of the said local equipment increases.

Figure 13:
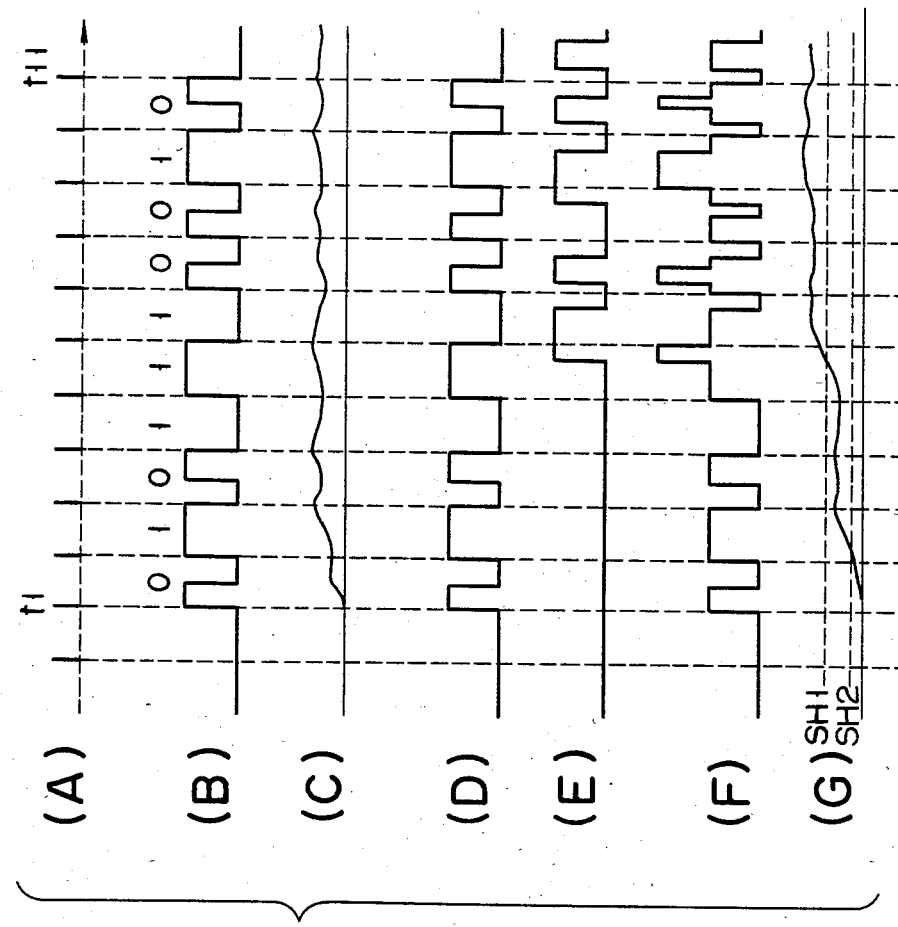
FIG. 13 is a time chart for explaining the collision detecting operation.

The signal transmitted over signal transmission path 14 may be encoded and modulated by various systems, and the methods of collision detection varies with the adopted encoding and modulating systems. A collision detection method in case where a bi-phase encoding system is adopted will now be described with reference to FIGS. 12 and 13.

FIG. 12 shows the collision detecting circuit 71 and overspace detecting circuit 72. The collision detecting circuit 71 includes a lowpass filter (LPF) 81 connected to receive a signal transmitted over up link 14a, a comparator 82 for comparing an output voltage of lowpass filter 81 with a first threshold voltage $SH_1$, and a monostable multivibrator 83 connected to the output of comparator 82. When the lowpass-filter output voltage exceeds the threshold level $SH_1$, the comparator 82 produces an output of "1" to trigger monostable multivibrator 83, which thus produces a collision detection signal CD of a logic level "1" indicative of a collision.

In overspace detecting circuit 72, a comparator 84 compares the lowpass-filter output voltage with a second threshold voltage $SH_2$ to produce an output voltage of a logic level "1" while the lowpass-filter output voltage is lower than the voltage $SH_2$. The comparator output is fed to a timer 85. The timer 85 measures the duration of the "1" level output voltage of comparator 84 to generate an output voltage corresponding to the duration. For example, this may be performed by counting clock pulses over the duration of the "1" level output voltage of comparator 84 and converting the count value into an analog voltage. The output voltage of timer 85 corresponds to a space between words, as will be described later in detail. A comparator 86 compares this voltage with a threshold voltage Sm corresponding to the maximum permissible space. When the output voltage of timer 85 exceeds the voltage Sm, the comparator 86 generates an output voltage of a logic level "1" to trigger a monostable multivibrator 87, which thus generates an overspace detection signal OSD of a logic level "1".

Assume now that a logic data signal "0101110010" is transmitted. The bits of the data signal are generated at respective times $t_1$ to $t_{11}$, as shown in FIG. 13A. This data signal is encoded by bi-phase encoding system, whereby an encoded signal, as shown in FIG. 13B, is sent out. When any signal is not transmitted over the transmission path the signal level on the path is zero. When a signal is transmitted, on the other hand, a DC level prevails on the path. Thus, when a signal, as shown in FIG. 13B is fed to lowpass filter 81 of FIG. 12, a DC output, as shown in FIG. 13C, appears at its output.

Assume now that two signals, as shown in FIGS. 13D and 13E, are simultaneously sent out over up link 14a. These signals are superimposed on each other, and the resultant composite signal, as shown in FIG. 13F, enters lowpass filter 81. Consequently, the lowpass filter 81 provides an output voltage, as shown in FIG. 13G, with the peak value thereof reaching as high as substantially double the level in the absence of a collision (FIG. 13C).

The threshold voltage level $SH_1$ of comparator 82 of FIG. 12 is set to substantially 1.5 times the DC output voltage of lowpass filter 81 that is obtained in the absence of collision. When a collision occurs, the output of comparator 82 thus goes to a logic level "1", causing monostable multivibrator 83 to produce a collision-detection signal CD with a constant duration.

The threshold voltage level $SH_2$ of overspace detecting circuit 84 is set to substantially 0.5 D. During the space between words, the output voltage of lowpass filter 81 is zero volt. When the output voltage of lowpass filter 81 is below 0.5 D, the output of comparator 84 goes high, representing the occurrence of a space. The timer 85 measures the duration of the space. The comparator 86 compares this duration with the maximum permissible duration of space. When the duration of the space measured by timer 85 exceeds Sm, a monostable multivibrator 87 produces an overspace detection signal OSD having a fixed duration. The maximum permissible duration of space is desirably $1.2\Delta$.

The control operation in this embodiment will now be described with reference to FIG. 14. In this case, it is assumed that the signal transmission times between central equipment 11 and local equipments $12_1$ to $12_4$ are $1\Delta$, $3\Delta$, $3.5\Delta$ and $7\Delta$, respectively. Also it is assumed that the sequence of words $WO_1$ to $WO_4$, in one frame, transmitted from central equipment 11 to local equipments $12_1$ to $12_4$ is as shown in FIG. 14A.

In this example, the transmission start time control is performed with a point of time of detection of a self-addressed word sync signal $SO_i$ by each local equipment taken as a reference time. The time interval from the reception of the self-addressed word to the detection of the word sync signal $SO_i$ is set to T's for all the local equipments. It is further assumed that each local equipment 12 starts to transmit a signal over up link 14a at time $T_i$ (i=1, 2, 3, 4) after the reference time. The time $T_i$ is a delay time which is controlled by transmission-start timing-control circuit 75. It is further assumed that the words $WO_1$ to $WO_4$ transmitted from the central equipment 11 to the local equipments have an equal word length, and also the words $WI_1$ to $WI_4$ transmitted from the local equipments to the central equipment have an equal word length.

Several algorithms are conceivable for the timing control in transmission-start timing-control circuit 75. A time control according to a first algorithm will now be described. The first algorithm is as follows.

(1) The transmission start timing of the first word $WI_3$ in the frame is not controlled.

(2) When a collision between words occurs, the delay time in the local equipment, which generated the succeeding word in collision, is increased by $\Delta$.

(3) When an overspace occurs between words, the delay time in the local equipment which generated the succeeding word is reduced by $\Delta$.

The initial value of the controllable delay time $T_i$ of each local equipment is assumed to be $5\Delta$. When the words $WO_3$, $WO_1$, $WO_4$ and $WO_2$ are sequentially transmitted, as shown in FIG. 14A, on down link 14b, the local equipments $12_3$, $12_1$, $12_4$ and $12_2$ transmit words $WI_3$, $WI_1$, $WI_4$ and $WI_2$ on up link 14a at timings as shown in FIGS. 14B to 14E. These timings are each determined by the signal transmission time from the central equipment to each local equipment, time Ts required for the word sync signal detection, and delay time $T_i$. In FIGS. 14B to 14E, time intervals $T_3$, $T_1$, $T_4$ and $T_2$ are equal to $5\Delta$, which is the initial value of the delay time $T_i$. The word transmitted from each local equipment on up link 14a reaches central equipment 11 after the lapse of the corresponding signal-transmission time. FIG. 14F shows the timings at which the words $WI_3$, $WI_1$, $WI_4$ and $WI_2$ arrive at central equipment 11. It will be seen that collisions Q1 and Q2, shown as shadded, and overspaces S1 and S2 occur so long as the delay time $T_i$ is held at the initial value. The lengths of time (i.e., inter-word times) of the collisions and overspaces are shown in Table 1 on a row corresponding to $n_c=0$ ($n_c$: times of effective control operations performed by transmission start-timing control circuit 75).

TABLE 1

(The delay time and inter-word time are shown in $\Delta$.)

Figure 14:
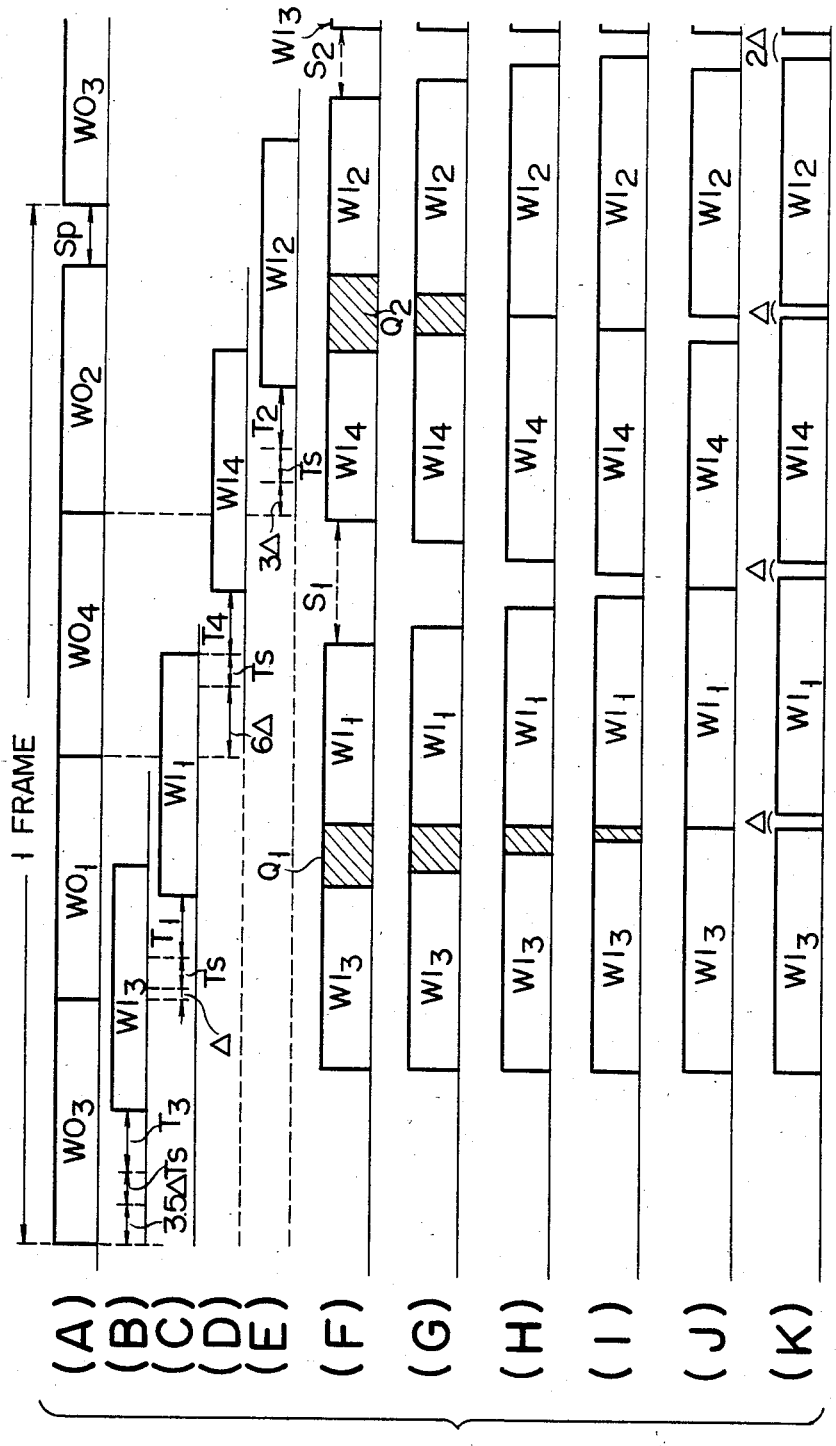
FIG. 14 is a time chart for explaining the operation of the second embodiment of the invention.

| | | Delay time | | | | Inter-word time | | | Control signal | | | | FIG. 14 |
|---|---|---|---|---|---|---|---|---|---|---|---|---|---|
| | | $T_3$ | $T_1$ | $T_4$ | $T_2$ | $S_{31}$ | $S_{14}$ | $S_{42}$ | $S_{23}$ | $CT_3$ | $CT_1$ | $CT_4$ | $CT_2$ | |
| Times | 0 | 5 | 5 | 5 | 5 | −5 | 10 | −6 | 6 | 0 | + | − | + | (F) |
| $n_c$ of | 1 | 5 | 6 | 4 | 6 | −4 | 8 | −4 | 5 | 0 | + | − | + | (G) |
| control | 2 | 5 | 7 | 3 | 7 | −3 | 6 | −2 | 4 | 0 | + | − | + | |
| opera- | 3 | 5 | 8 | 2 | 8 | −2 | 4 | 0 | 3 | 0 | + | − | + | (H) |
| tion | 4 | 5 | 9 | 1 | 9 | −1 | 2 | 2 | 2 | 0 | + | − | − | (I) |
| | 5 | 5 | 10 | 0 | 8 | 0 | 0 | 2 | 3 | 0 | + | + | − | (I) |
| | 6 | 5 | 11 | 1 | 7 | 1 | 0 | 0 | 4 | 0 | 0 | + | + | |
| | 7 | 5 | 11 | 2 | 8 | 1 | 1 | 0 | 3 | 0 | 0 | 0 | + | |
| | 8 | 5 | 11 | 2 | 9 | 1 | 1 | 1 | 2 | 0 | 0 | 0 | 0 | (K) |

The inter-word time $S_{ij}$ represents the time interval between two consequtive words $WI_i$ and $WI_j$. It is indicative of a collision when it is negative, while it is indicative of an overspace when it is positive. For example, $S_{31}=-5\Delta$, in the row for $n_c=0$ in Table 1, is indicative of a collision Q1 having a length of time of $-5\Delta$ between words $WI_3$ and $WI_1$, and $S_{14}=10\Delta$ is indicative of an overspace S1 having a length of time of $10\Delta$ between words $WI_1$ and $WI_4$.

When the signal shown in FIG. 14F enters central equipment 11, the collisions Q1 and Q2 are detected by collision detecting circuit 71, while the overspaces S1 and S2 are detected by overspace detecting circuit 72. The word sync signals $SI_3$ and $SI_4$ of words $WI_3$ and $WI_4$ are detected by word-sync signal-detecting circuit 22a. However, the word sync signals $SI_1$ and $SI_2$ of words $WI_1$ and $WI_2$ cannot be detected due to collisions Q1 and Q2. The control-signal generating circuit 73 decides that a collision occurs between words $WI_3$ and $WI_1$ due to word $WI_1$, and generates control signal $CT_1$. The control signal $CT_1$ is expressed as "+". For the word $WI_2$, the control-signal generating circuit 73 also generates a control signal $CT_2$ (+) indicative of a collision.

For the overspace S1 between words $WI_1$ and $WI_4$, the control signal generating circuit 73 generates a control signal $CT_4$ for word $WI_4$. This control signal $CT_4$ is expressed as "−", indicating that the overspace detection signal OSD is "1".

The overspace S2 is detected between the last word $WT_2$ in a frame and the first word $WI_3$ in the next frame. In this case, the control signal $CT_3$ is not generated with respect to word $WI_3$. This is because, according to the first control argorithm, the transmission start timing of the first word in the frame is not controlled. At this time, $CT_3$ is represented by "0". The control signal $CT_i$, generated in the manner as described, is added to the corresponding word $WO_i$ and then sent to the corresponding local equipment $12_i$. In the local equipment $12_i$, the control-signal detecting circuit 74 detects the control signal $CT_i$ which has two bits of a collision detection signal CD and overspace detection signal OSD.

When the collision detection signal CD is "1" (control signal $CT_i$ is represented as "+"), the transmission start-timing control circuit 75 increases the delay time $T_i$ by one unit time $\Delta$ to retard the transmission of word $WI_i$. On the other hand, when the overspace detection signal OSD is "1" (control signal $CT_i$ is represented by "−"), it reduces the delay time $T_i$ by $\Delta$ to advance the start of transmission of word $WI_i$. When both the detection signals CD and OSD are "0" (control signal $CT_i$ is represented as "0"), the delay time $T_i$ remains unchanged.

With the first timing control operation performed according to control signals when $n_c=0$, the delay times $T_3$, $T_1$, $T_4$ and $T_2$ of local equipments $12_3$, $12_1$, $12_4$ and $12_2$ are changed by 0, $+\Delta$, $-\Delta$ and $+\Delta$, respectively. Consequently, the delay times $T_3$, $T_1$, $T_4$ and $T_2$ for $n_c=1$ become $5\Delta$, $6\Delta$, $4\Delta$ and $6\Delta$, respectively. As a result of this control operation, the condition of signal reception in the central equipment 11 becomes as shown in FIG. 14G. It is to be noted that the lengths of time of the collisions Q1 and Q2 and overspaces S1 and S2 are all reduced. The control operation as described is repeatedly performed until the 8th control operation (for $n_c=8$) is completed. At this time, the inter-word times $S_{31}$, $S_{14}$, $S_{42}$ and $S_{23}$ are $\Delta$, $\Delta$, $\Delta$ and $2\Delta$, respectively.

According to the control argorithm described above, an inter-word time of zero is regarded as the occurrence of a collision (see FIG. 14J). To this end, the collision detecting circuit 71 may be modified to produce a collision detection signal of "1" when the output voltage of lowpass filter 81 is above a predetermined level over a length of time longer than a predetermined word length.

The minimum value of space Sp between the last word $WO_2$ in a frame and the first word $WO_3$ in the next frame, as shown in FIG. 14A, is determined by an allowable space between words transmitted from local equipments $12_1$ to $12_4$ to central equipment 11.

Figure 15:
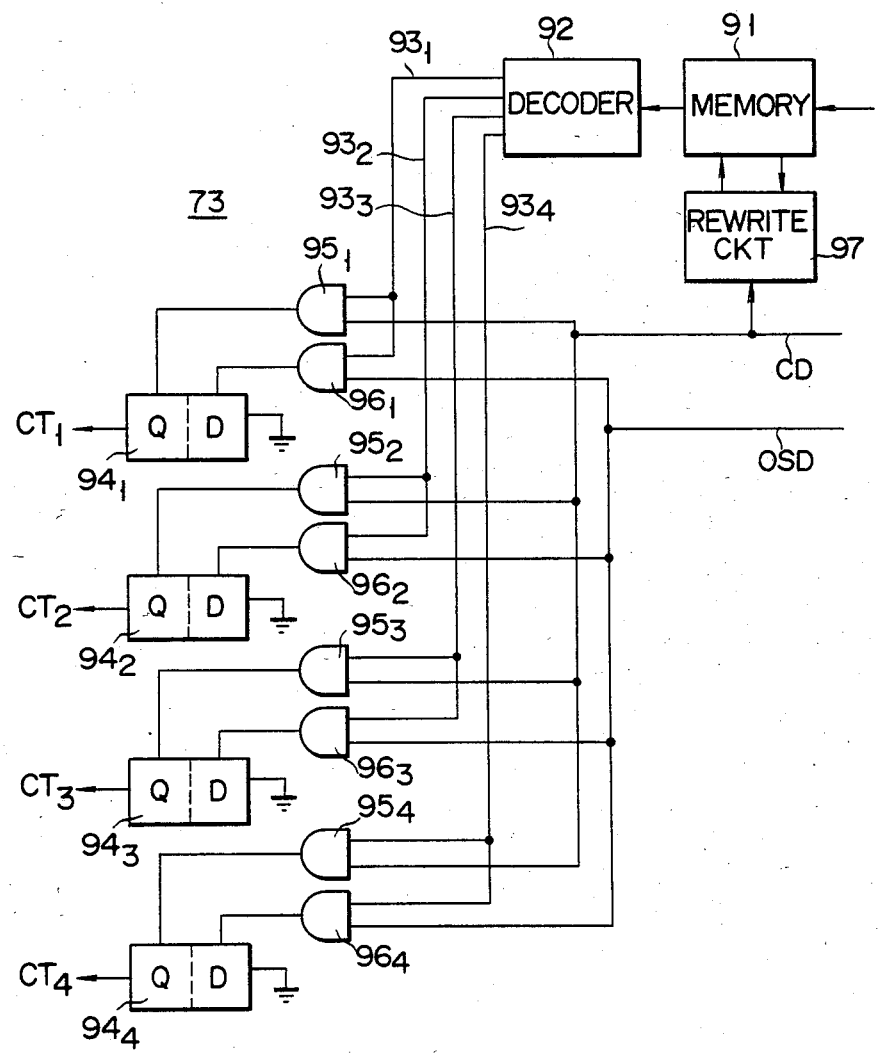
FIG. 15 is a block diagram of a control-signal generating circuit of FIG. 9.

The control signal generating circuit 73 will now be described with reference to FIG. 15. The word number information (i.e. addrerss information) detected by word sync signal detecting circuit 22a is temporarily stored in a memory 91. The word number information temporarily stored in memory 91 is applied to a decoder 92. The decoder 92 has output terminals $93_1$ to $93_4$ equal in number to the words in one frame. The decoder is arranged to decode the word number information of word $WI_i$ and generate a signal of "1" at an output corresponding to a word $WI_j$ to be transmitted next to the word $WI_i$. In the case of FIG. 14, for example, when the word number information of word $WI_3$ is supplied to decoder 92, the decoder 92 generates a signal of "1" at the output terminal $93_1$ corresponding to the next word $WI_1$.

2-bit shift registers $94_1$ to $94_4$ are provided for the respective outputs $93_1$ to $93_4$ of decoder 92. The first output $93_1$ of decoder 92 and the collision detection signal CD from collision detecting circuit 71 are ANDed by an AND gate $95_1$ to set a first stage of shift register $94_1$. The first decoder output $93_1$ and the overspace detection signal OSD are ANDed by an AND gate $96_1$ to set a second stage of shift register $94_1$. When the first decoder output $93_1$ and collision detection signal CD are both "1", the first bit Q of shift register $94_1$ is set to "1". Likewise, when the first decoder output $93_1$ and overspace detection signal OSD are both "1", the second bit D of shift register $94_1$ is set to "1". The input of second stage of shift register $94_1$ is grounded, so that both the first and second bits are "0" unless the outputs of both the AND gates $95_1$ and $96_1$ are "1".

Like the AND gates $95_1$ and $96_1$, AND gates $95_2$ to $95_4$ and $96_2$ to $96_4$ are provided for the respective registers $94_2$ to $94_4$. The shift registers $94_1$ to $94_4$ generate control signals $CT_1$ to $CT_4$ corresponding to the words $WI_1$ to $WI_4$, respectively.

When a collision occurs between words $WI_i$ and $WI_j$, the word sync signal $SI_j$ of the succeeding word $WI_j$ cannot be detected. Therefore, the content of memory 91 remains unchanged, and a control signal $CT_k$ for a word $WI_k$ next to the word $W_j$ cannot be produced. Accordingly, the memory 91 must be rewritten when a collision occurs between two words. To this end, a rewriting circuit 97 is provided for rewriting the content of memory 91 in response to the collision detection signal CD. It is arranged to, when a collision occurs between words $WI_i$ and $WI_j$, rewrite the word number information of the word $WI_j$ stored in memory 91 to the word number information of word $WI_k$ next to word $WI_j$. As a result, a correct control signal can be generated for the word $WI_k$.

The operation of control signal generating circuit 73 will now be described with reference to FIG. 14. When collision Q1 occurs between words $WI_3$ and $WI_1$, as shown in FIG. 14F, the first bit Q of shift register $94_1$ is set, so that a control signal $CT_1$ of "10" is obtained from shift register 94. This signal "10" corresponds to a control signal "+" indicative of a collision, as shown in Table 1.

With this collision Q1, the memory 91 is rewritten to store the word number information of the word $WI_4$ next to the word $WI_1$. When overspace S1 between words $WI_1$ and $WI_4$ is detected, the second bit of shift register $94_4$ is set so that a control signal $CT_4$ of "01" is obtained. This signal "01" corresponds to a signal "−", as shown in Table 1. The word sync signal of the word $WI_4$ can be detected, so that the word number information thereof is stored in memory 91. With collision Q2 occurring between words $WI_4$ and $WI_2$, the first bit of shift register $94_2$ is set so that a control signal $CT_2$ of "10" is generated, and the memory 91 is rewritten to store the word number information of the word $WI_3$.

For the overspace S2 between the word $WI_2$ and the first word $WI_3$ in the next frame, the shift register $94_3$ generates a control signal $CT_3$ of "01". This control signal $CT_3$ is changed from "01" to "00" by suitable means. This is done because, according to the argorithm mentioned earlier, the transmission start timing of the first word in the frame is not controlled. Alternatively, the shift register $94_3$ for the first word may be arranged so that it cannot be set by suitable means.

Figure 17:
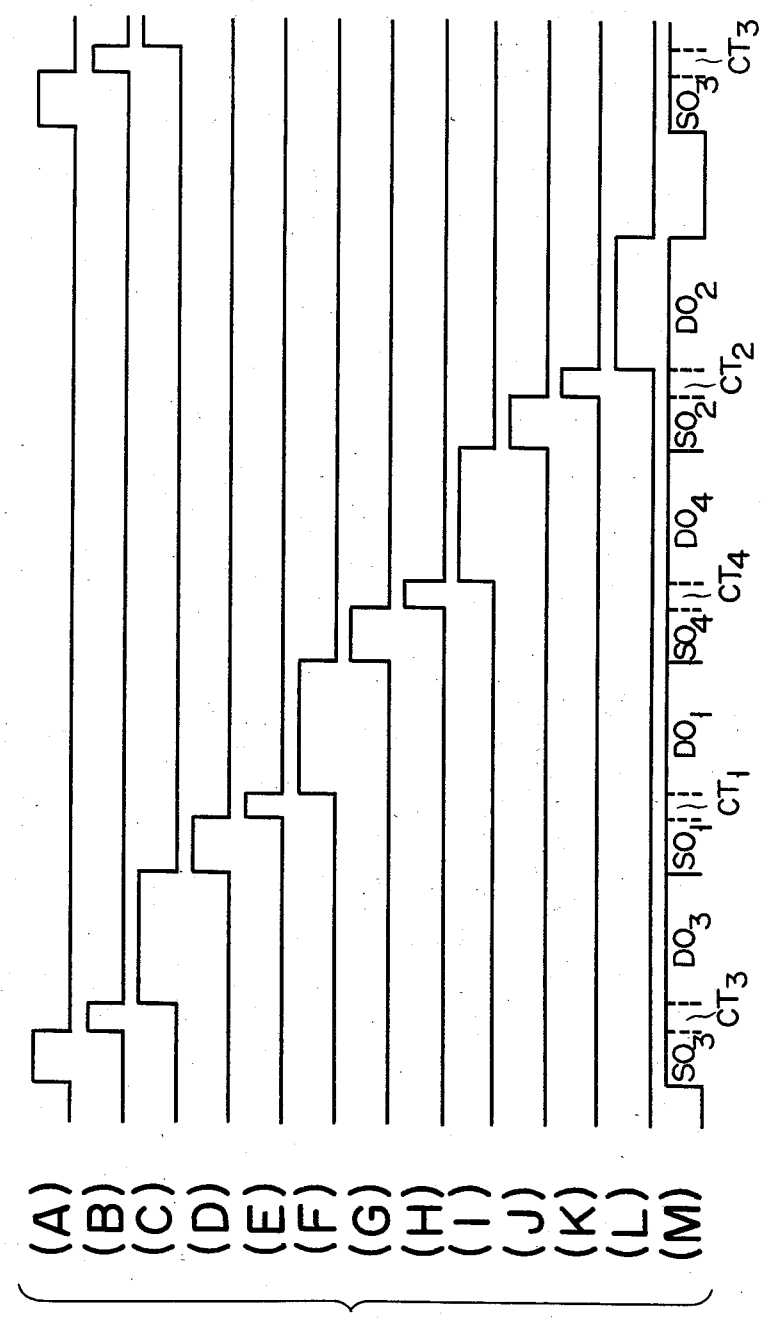
FIG. 17 is a time chart for explaining the operation of the multiplexer of FIG. 16.

The multiplexer 25a will now be described with reference to FIG. 16. Data signals $DO_1$ to $DO_4$ from exchange 24a are temporarily stored in memories $101_1$ to $101_4$. Word sync signal generators $102_1$ to $102_4$ are provided for generating respective word sync signals $SO_1$ to $SO_4$. The word sync signals $SO_1$ to $SO_4$, control signals $CT_1$ to $CT_4$, and data $DO_1$ to $DO_4$ are applied to and AND-OR gate 103. A timing signal generating circuit 104 is provided which receives clock signal synchronized with exchange 24 and generates timing signals as shown in FIGS. 17A to 17L, which are also fed to AND-OR gate 103. The AND-OR gate 103 generates one-frame transmission signal, as shown in FIG. 17M.

Figure 18:
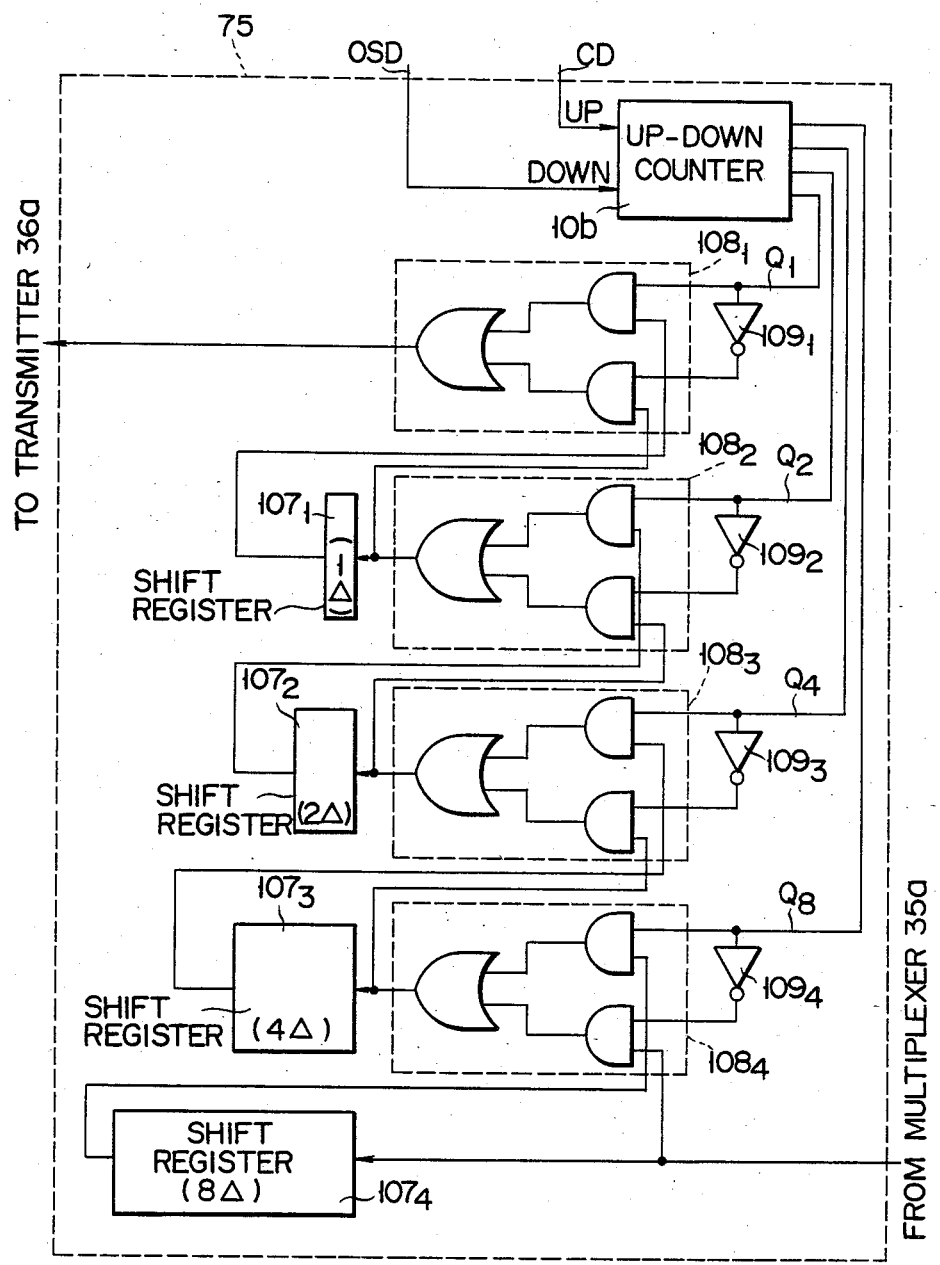
FIG. 18 is a transmission timing control circuit of FIG. 10.

The transmission-start timing-control circuit 75 will now be described with reference to FIG. 18. It includes an up/down counter 106, shift registers $107_1$ to $107_4$, AND-OR gates $108_1$ to $108_4$, and inverters $109_1$ to $109_4$. The shift registers $107_1$ to $107_4$ have one, tow, four and eight stages, respectively, and thus provide delay times $1\Delta$, $2\Delta$, $4\Delta$ and $8\Delta$ to the respective input signals thereof.

The output of AND-OR gate $108_1$ is coupled to transmitter 36a. The outputs of AND-OR gates $108_2$ to $108_4$ are coupled to the respective inputs of registers $107_1$ to $107_3$. The output of multiplexer 35a is coupled to the input of shift register $107_4$. The input and output of shift register $107_1$ are coupled to two inputs of AND-OR gate $108_1$. Likewise, the input and output of shift registers $107_2$ to $107_4$ are coupled to two inputs of respective AND-OR gates $108_2$ to $108_4$.

The collision detection signal CD is applied to an up input of up/down counter 106, while the overspace detection signal OSD is applied to its down input. The up/down counter 106 provides four outputs $Q_1$, $Q_2$, $Q_4$ and $Q_8$ with respective weights of 1, 2, 4 and 8. The initial count of up/down counter 106 is set to 5, which corresponds to the initial value $5\Delta$ of the delay time $T_i$ described above. The outputs $Q_1$, $Q_2$, $Q_4$ and $Q_8$ of up/down counter 106 are coupled to AND-OR gates $108_1$ to $108_4$ as shown.

With the control circuit 75 arranged as above, when the count of up/down counter 106 is 5, the input signal from multiplexer 35a is applied to transmitter 36a through shift registers $107_3$ and $107_1$. That is, a delay time of $5\Delta$ is provided for the input signal. Every time a collision detection signal CD is supplied, the up/down counter 106 increments, so that the delay time $T_i$ provided for an input signal increases by $1\Delta$. On the other hand, every time an overspace detection signal OSD is supplied, the up/down counter 106 decrements, thus reducing the delay time $T_i$ by $1\Delta$.

Some other timing-control argorithms than that described are given below.

A second argorithm is as follows.

(1) A specific word, the transmission start timing of which is fixed, is selected from the words $WI_1$ to $WI_4$ in one frame.

(2) When a collision occurs between words, the delay time $T_i$ for the preceding word is reduced by $\Delta$.

(3) When an overspace occurs between words, the delay time $T_i$ for the preceding word is increased by $\Delta$.

(4) A zero inter-word time between words is not regarded as a collision.

A third argorithm is as follows.

(1) The delay times $T_i$ for all the words $WI_1$ to $WI_4$ are controlled.

(2) The delay time $T_i$ is controlled to shift the word $W_i$ in a direction for providing a space between the word $WI_i$ and the next word $WI_j$ to avoid a collision and an overspace. For example, in the cae of FIG. 14F, the delay time $T_3$ for the word $WI_3$ is reduced while the delay time $T_1$ for the word $WI_1$ is increased. Also, the delay time $T_1$ for the word $WI_4$ is reduced and the delay time $T_1$ for the word $WI_4$ is increased.

(3) A zero inter-word time between words is not regarded as a collision.

According to the control argorithms mentioned above, the central equipment detects a collision and an overspace between words and notifies each local equipment $12_i$ of the direction of change of the delay time $T_i$ for the word $WI_i$ according to the result of detection. Whenever a collision or overspace is detected, the delay time $T_i$ is changed by a unit time.

Alternatively, the central equipment may be arranged to measure the duration of a collision or overspace between words and correspondingly form a timing control signal of a plurality of bits representing the magnitude and direction of change of the delay time, so that the control of the delay time for each word is performed more rapidly than in the previous embodiment. Morover, either a collision or overspace between words alone may be detected and the delay time $T_i$ for the word $WI_i$ may be correspondingly controlled, to permit prevention of the collision and overspace.

We claim:

1. A bus-shaped local area network comprising:
a central equipment having an input and an output;
a bi-directional signal transmission line having one end connected to said input and output of said central equipment; and
a plurality of local equipments connected to said signal transmission line downstream of said control equipment, and each having at least one terminal connected to said bi-directional signal transmission line;
said central equipment comprising means for transmitting, on a time division basis, data signals addressed to said local equipments to said signal transmission line, and said local equipments each comprising means for transmitting a data signal from said terminal to said central equipment via said signal transmission line in response to the reception of a data signal transmitted from said central equipment and addressed to the respective local equipment;
said central equipment including means for generating control signals addressed to said local equipments in response to the reception of signals transmitted from said local equipments, the control signals being transmitted over said signal transmission line on a time division basis; and said local equipments each including means for controlling a transmission start timing of a data signal to be transmitted to said central equipment via said signal transmission line in response to a control signal addressed to the respective local equipment.

2. A bus-shaped local area network comprising:
a central equipment having an input and an output;
a bi-directional signal transmission line having one end connected to said input and output of said central equipment; and
a plurality of local equipments connected to said signal transmission line downstream of said control equipment, and each having at least one terminal connected to said bi-directional transmission signal line;
said central equipment comprising means for the transmitting, on a time division basis, data signals addressed to said local equipments to said signal transmission line, and said local equipments each comprising means for transmitting a data signal to said central equipment via said signal transmission line in response to the reception of a data signal transmitted from said central equipment and addressed to the respective local equipment;
said central equipment including:
means for generating test signals addressed to said respective local equipments, the test signals being transmitted over said signal transmission line on a time division basis;
means for measuring a delay time between a point of time when a test signal addressed to each local equipment is transmitted from said central equipment and a point of time when a signal transmitted from the local equipment in response to the reception of the test signal addressed thereto is received by said central equipment; and
means for generating a control signal for controlling a transmission start timing of a data signal from each local equipment according to the delay time measured for the local equipment, the control signals addressed to said local equipments being transmitted over said signal transmission line on a time division basis; and
each local equipment including:
means for detecting a control signal addressed thereto; and
means for controlling the transmission start timing of a data signal to be transmitted over said signal transmission line in response to the detected control signal.

3. The local area network according to claim 2, wherein:
the test signals each include a sync signal component having address information for identifying a local equipment, and a test control signal component;
said control signal detecting means of each local equipment includes:
means for detecting a sync signal component addressed to the respective local equipment;
means for detecting the test control signal component in response to the detection of the sync signal component addressed thereto by said sync signal detecting means; and
means responsive to said test control signal detecting means for transmitting a sync signal identical with the self-addressed sync signal component over said signal transmission line upon detection of the test control signal by said test control signal detecting means;
said delay time measuring means of said central equipment comprising means for measuring a time interval between a point of time of transmission of a test signal to each local equipment and a point of time of reception of the sync signal transmitted from the local equipment in response to the reception of the test signal; and
said control signal generating means comprising means for generating a control signal including a sync signal component and a timing control data component corresponding to the measured delay time.

4. The local area network according to claim 3, wherein:

the timing-control data component addressed to each local equipment has a time control amount such that the time interval between a point of time of transmission of a data signal from said central equipment to the local equipment and a point of time of reception by said central equipment of a data signal transmittted from the local equipment becomes substantially equal to the time intervals with respect to other local equipments.

5. The local area network according to claim 2, wherein:
the data signal transmitted from said central equipment to each local equipment includes time-division multiplexed data components addressed to said terminals connected to the local equipment; and
the data signal transmitted from each local equipment to said central equipment includes time-division multiplexed data components from said terminals connected to the local equipment.

6. The local area network according to claim 5, wherein:
each local equipment includes:
a distributor connected to receive the self-addressed time-division multiplexed data components for distributing the data components to said terminals; and
a multiplexer for time-division multiplexing data components form said terminals.

7. The local area network according to claim 5, wherein:
the data signal transmitted from said central equipment to each local equipment includes a sync signal component containing address information for the local equipment; and
the data signal transmitted from each local equipment to said central equipment includes a sync signal component containing address information for the local equipment.

8. A bus-shaped local area network comprising:
a central equipment having an input and an output;
a bi-directional signal transmission line having one end connected to said input and output of said central equipment; and
a plurality of local equipments connected to said signal transmission line downstream of said control equipment, and each having at least one terminal connected to said signal transmission line;
said central equipment comprising means for transmitting, on a time division basis, data signals addressed to said local equipments to said signal transmission line, said local equipments each comprising means for transmitting a data signal to said central equipment via said signal transmission line in response to the reception of a data signal transmitted from said central equipment and addressed to the respective local equipment;
said central equipment including:
means for detecting a collision between words when receiving data signals from said local equipments; and
means responsive to said collision detecting means for generating a control signal addressed to each local equipment for controlling a transmission start timing of a data signal to be transmitted from the local equipment to said central equipment, control signals addressed to said local equipments being transmitted over said signal transmission line on a time division basis; and
each local equipment includes:
means for detecting a control signal addressed thereto; and
means for controlling the transmission start timing of a data signal to said central equipment in response to the detected control signal.

9. The local area network according to claim 8, wherein:
said control signal generating means of said central equipment comprises means for generating a control signal each time a collision between data signals transmitted from local equipments is detected by said collision detecting means; and
said transmission start timing control means of each local equipment comprises means for varying the transmission start-timing of a data signal each time a control signal addressed thereto is detected.

10. The local area network according to claim 8, wherein:
said control signal generating means comprises means for generating a control signal instructing the retarding of the transmission start timing for the local equipment which generated the succeeding one of two data signals between which a collision occurred.

11. The local area network according to claim 8, wherein:
said central equipment includes overspace detecting means for detecting an overspace in excess of a predetermined space between words; and
said control signal generating means comprises means for generating a control signal instructing the advancement of transmission start timing for the local equipment which generated the succeeding one of two data signals between which an overspace is detected by said overspace detecting means.

12. The local area network according to claim 8, wherein:
the data signal transmitted from said central equipment to each local equipment includes a sync signal component containing address information identifying the local equipment, a control signal component generated by said control signal generating means, and time-division multiplexed data components addressed to said terminals connected to the local equipment; and
the data signal transmitted from each local equipment to said central equipment includes a sync signal component and time-division multiplexed data components from said terminals connected to the local equipment.

13. The local area network according to claim 12, wherein:
each local equipment includes:
a distributor connected to receive time-division multiplexed data components addressed thereto for distributing the data components to said terminals connected to the local equipment; and
a multiplexer for time-division multiplexing data components from said terminals.

14. The local area network according to claim 8, wherein:
said transmission start timing control means of each local equipment includes delay circuit means connected to receive a data signal to be transmitted over said signal transmission path, the delay time provided by said delay circuit means being controlled by the control signal.

15. A bus-shaped local area network comprising:
a central equipment having an input and an output;

a bi-directional signal transmission line having one end connected to said input and output of said central equipment; and a plurality of local equipments connected to said signal transmission line downstream of said central equipment, and each having at least one terminal connected to said signal transmission line;

said central equipment comprising means for transmitting, on a time division basis, data signals addressed to said local equipments to said signal transmission line, and said local equipments each being arranged to transmit a data signal to said central equipment via said signal transmission line in response to the reception of a data signal transmitted from said central equipment and addressed to the respective local equipment;

said central equipment including:

means for detecting an overspace in excess of a predetermined space between data signals when receiving data signals from said local equipments; and means responsive to said overspace detecting means for generating a control signal addressed to each local equipment for controlling a transmission start timing of a data signal from the local equipment to said central equipment, the control signals addressed to said local equipments being transmitted over said signal transmission path on a time division basis; and each local equipment including:

means for detecting a control signal addressed thereto; and means for controlling the transmission start timing of a data signal to said central equipment in response to the detected control signal.

16. The local area network according to claim 15, wherein:

said control signal generating means of said central equipment comprises means for generating a control signal every time an overspace between data signals from said local equipments is detected by said overspace detecting means; and said transmission start timing control means of each local equipment comprises means for varying the transmission start timing every time a control signal addressed thereto is detected.

17. The local area network according to claim 16, wherein:

said control signal generating means comprises means for generating a control signal instructing the advancement of the transmission start timing of the local equipment which generated the succeeding one of two data signals between which an overspace is detected.

* * * * *